United States Patent
Oba et al.

(10) Patent No.: US 10,565,736 B2
(45) Date of Patent: Feb. 18, 2020

(54) IMAGE PROCESSING APPARATUS AND METHOD, PROGRAM, AND IMAGE PROCESSING SYSTEM

(71) Applicant: SONY CORPORATION, Tokyo (JP)

(72) Inventors: Eiji Oba, Tokyo (JP); Takahiro Okubo, Kanagawa (JP); Takuya Yamaguchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 73 days.

(21) Appl. No.: 15/781,193

(22) PCT Filed: Jan. 4, 2017

(86) PCT No.: PCT/JP2017/000010
§ 371 (c)(1),
(2) Date: Jun. 4, 2018

(87) PCT Pub. No.: WO2017/122552
PCT Pub. Date: Jul. 20, 2017

(65) Prior Publication Data
US 2018/0365859 A1     Dec. 20, 2018

(30) Foreign Application Priority Data
Jan. 15, 2016   (JP) ................................. 2016-006003

(51) Int. Cl.
*H04N 13/02* (2006.01)
*G06T 7/80* (2017.01)
(Continued)

(52) U.S. Cl.
CPC ............ *G06T 7/85* (2017.01); *B60W 40/114* (2013.01); *G06K 9/00798* (2013.01); *G06T 3/0018* (2013.01)

(58) Field of Classification Search
CPC ..................... G06T 7/85; G06T 3/0018; G06T 2207/30252; G06T 7/80; G06T 3/00;
(Continued)

(56) References Cited

U.S. PATENT DOCUMENTS 5,715,483 A * 2/1998 Omata ..................... G02B 7/36
348/E5.045
5,877,809 A * 3/1999 Omata ..................... G02B 7/36
348/345
(Continued)

FOREIGN PATENT DOCUMENTS

JP     2001-160137 A     6/2001
JP     2011-185753 A     9/2011
(Continued)

OTHER PUBLICATIONS

International Search Report dated Apr. 4, 2017 in PCT/JP2017/000010, citing documents AM through AS therein, 2 pages.

*Primary Examiner* — Howard D Brown, Jr.
(74) *Attorney, Agent, or Firm* — Xsensus LLP

(57) ABSTRACT

The present disclosure relates to an image processing apparatus and method, a program, and an image processing system that enable detection of a positional and directional shift of a camera while the vehicle is running.
An image processing IC performs a calibration process on four cameras, using image signals from the four cameras, sensing information from a sensing chip, and information detected from a drive system unit or the like from a control microcomputer. For example, the image processing calibrates at least the orientations of the cameras disposed at the front and the rear, in accordance with the infinite point in the running background. Using the correction values obtained through the orientation calibration, the image processing IC generates overhead images of the respective cameras. Using the generated overhead images, the image processing IC
(Continued)

achieves continuity between the line segments between the adjacent cameras, and checks the continuity of first derivation of the line segments with respect to the running direction. By doing so, the image processing IC performs calibration on the right and left cameras. The present disclosure can be applied to a camera calibration system that includes a plurality of cameras and a processing device that calibrates the cameras, for example.

19 Claims, 22 Drawing Sheets

(51) Int. Cl.
- *B60W 40/114* (2012.01)
- *G06K 9/00* (2006.01)
- *G06T 3/00* (2006.01)

(58) Field of Classification Search
CPC ........... G06T 7/593; G06T 2207/10012; G06T 2207/30256; G06T 7/246; G06T 2207/20081; G06T 2207/20076; G06T 2207/10021; G06K 9/00798; B60W 40/114; B60R 2300/402; B60R 1/00; H04N 17/002; H04N 5/247; H04N 7/181; H04N 7/18; H04N 5/232; H04N 13/246; H04N 2013/0081

See application file for complete search history.

(56) References Cited

U.S. PATENT DOCUMENTS

| | | | |
|---|---|---|---|
| 2008/0062010 A1* | 3/2008 | Kobayashi | G06K 9/00798 340/937 |
| 2012/0242799 A1* | 9/2012 | Saito | G01S 7/4802 348/46 |
| 2018/0108150 A1* | 4/2018 | Curtis | G06T 7/85 |

FOREIGN PATENT DOCUMENTS

| | | |
|---|---|---|
| JP | 2011-215063 A | 10/2011 |
| JP | 2012-15576 A | 1/2012 |
| JP | 2012-185540 A | 9/2012 |
| JP | 2013-115540 A | 6/2013 |
| JP | 2013-129278 A | 7/2013 |
| JP | 2014-195170 A | 10/2014 |
| JP | 2015-165628 A | 9/2015 |

\* cited by examiner

A

B

IMAGE PROCESSING APPARATUS AND METHOD, PROGRAM, AND IMAGE PROCESSING SYSTEM

TECHNICAL FIELD

The present disclosure relates to an image processing apparatus and method, a program, and an image processing system, and more particularly, to an image processing apparatus and method, a program, and an image processing system capable of detecting a positional/directional shift of a camera while the vehicle is running.

BACKGROUND ART

In a conventional system called a top-view or surround-view system that displays the surroundings of a vehicle as viewed from above, cameras mounted on the outer periphery of the vehicle take images of the road surface obliquely from sides, a position (a height and a direction with respect to the cameras) of the plane of the road surface is provisionally determined, and a road image of the entire external surroundings of the vehicle is formed by combining the respective images from the cameras as a projected image on the assumption that the road surface is a flat surface according to the captured images.

Shifts and the like from ideal set values based on actual installation are caused by manufacturing and installation. Therefore, at the stage of the vehicle manufacturing, internal parameters (a camera focal length, a distortion amount, and an optical axis shift) for each camera and external parameters (an installation height from the road surface, a direction/pitch and a yaw angle of the optical axis with respect to the road surface, and turning/rotation with respect to the road surface) for each camera are calibrated, so that the installation errors are absorbed, and combined images of the respective cameras mounted on a plurality of positions are continuously displayed in an ideal manner.

However, even if shifts from the ideal set values of the installation height and the orientation of the cameras constituting the system with respect to the road surface are calibrated, the relative positional relationship with the road surface might change due to various factors such as the load amount and balance on the vehicle, physical impact, and the like, and the calibrated values might change accordingly.

To counter these shifts of the installation height and orientation and changes in the features unique to the cameras, special calibration charts are provided around the vehicle in a special place for the time of the vehicle manufacturing or maintenance of the completed vehicle, and calibration for parameters that are the factors of the changes is performed with the use of target patterns and the like on those charts.

For example, Patent Document 1 discloses a technique by which an image shift is detected with a pair of front and rear cameras. Further, Patent Document 2 discloses a technique by which calibration of the front camera is performed using the vanishing point.

On the other hand, if there is a load on the vehicle or a slope or a step on the road surface, an image obtained as a result of integral overhead-view transform still has a shift in the original state, even though ideal projected images of the road surface are formed by the respective cameras. If the situation changes, the road image also changes. Therefore, it is not realistic to perform calibration at the place of the manufacturer or a service station each time as in the case of maintenance while the shift still remains.

CITATION LIST

Patent Documents

Patent Document 1: Japanese Patent Application Laid-Open No. 2014-195170
Patent Document 2: Japanese Patent Application Laid-Open No. 2011-185753

SUMMARY OF THE INVENTION

Problems to be Solved by the Invention

In view of the above, it is preferable to be able to perform dynamic parameter calibration in a specific state, such as a case where a load is put on the vehicle.

The present disclosure has been made in view of those circumstances, and aims to detect a positional/directional shift of a camera during the vehicle is running.

Solutions to Problems

An image processing apparatus of one aspect of the present technology includes: a vehicle state detection unit that detects a straight-running state of a vehicle; a line segment detection unit that detects line segments from an image captured by a first camera, an image captured by a second camera disposed at a position on the opposite side of the vehicle from the first camera, and an image captured by a third camera different from both the first camera and the second camera; an infinite point detection unit that detects an infinite point in a running background; a first correction amount calculation unit that calculates a correction amount of the first camera, in accordance with the infinite point detected by the infinite point detection unit; a second correction amount calculation unit that calculates a correction amount of the third camera, in accordance with the correction amount of the first camera calculated by the first correction amount calculation unit and the line segments detected by the line segment detection unit; and a correction processing unit that performs a correction process on a field angle of the first camera, in accordance with the correction amount of the first camera.

The image processing apparatus may further include a storage unit that stores a field angle mismatch amount that is the correction amount of the first camera as a shift angle between a camera optical axis and a vehicle running direction, when the infinite point detected by the infinite point detection unit does not match a convergence point of the line segments detected by the line segment detection unit.

In accordance with a time series change caused by running of the vehicle in the line segments detected by the line segment detection unit, the first correction amount calculation unit may calculate the correction amount of the first camera by using a line segment in which a shift having a normal-direction component does not occur among the line segments detected by the line segment detection unit, and prohibit a process of calculating the correction amount of the first camera by using a line segment in which a shift having the normal-direction component occurs.

The image processing apparatus may further include a running direction detection unit that detects a running direction of the vehicle. When there is no change in the running direction detected by the running direction detection, in accordance with a time series change caused by running of the vehicle in the line segments detected by the line segment detection unit, the first correction amount calculation unit may calculate the correction amount of the first camera by using a line segment in which a shift having a normal-direction component does not occur among the line segments detected by the line segment detection unit, and prohibit a process of calculating the correction amount of the first camera by using a line segment in which a shift having the normal-direction component occurs.

The image processing apparatus may further include a running direction detection unit that detects a running direction of the vehicle. When there is no change in the running direction detected by the running direction detection, in accordance with a time series change caused by running of the vehicle in the line segments detected by the line segment detection unit, the first correction amount calculation unit may prohibit a process of calculating the correction amount of the first camera by using a plurality of line segments when there is a time series change in a line segment intersection point of the plurality of line segments detected by the line segment detection unit.

The running direction detection unit may detect the running direction of the vehicle by detecting a yaw angle of the vehicle.

The second correction amount calculation unit may calculate a correction amount of the second camera so that first derivation of a line segment in an overhead-view transformed image of the line segment detected while the vehicle is running becomes the same between different camera images, an axis being a running direction of the line segments detected by the line segment detection unit.

The second correction amount calculation unit may calculate a correction amount of the second camera so that first derivation of the line segments detected by the line segment detection unit becomes the same in an overhead image or an undistorted image projected through fisheye projection, an axis being a running direction of the line segments detected by the line segment detection unit.

In accordance with a recognition pattern on an imaged road surface, the second correction amount calculation unit may calculate position correction of the third camera so that a position in a vehicle running direction identified by each camera is the same between the image captured by the first camera and the image captured by the third camera.

The first correction amount calculation unit may calculate the correction amount of the first camera and a correction amount of the second camera, in accordance with the infinite point detected by the infinite point detection unit and a tilt of the line segments detected by the line segment detection unit. The second correction amount calculation unit may calculate the correction amount of the third camera and a correction amount of a fourth camera disposed at a position on the opposite side from the third camera, in accordance with the correction amount of the first camera and the correction amount of the second camera, and the line segments detected by the line segment detection unit.

When lane widths are detected by the first and second cameras, the first correction processing unit may perform correction for matching the lane widths.

When lane widths are not detected by the first and second cameras at the same time, the first correction processing unit may perform correction for matching the lane width detected by the first camera to a vehicle width detected at a predicted passage time after a camera field of the second camera passed through.

The image processing apparatus may further include: a difference detection unit that detects a difference in timing among the first, second, and third cameras; and a command transmission unit that transmits a synchronization command to each camera via a signal line, in accordance with the difference detected by the difference detection unit.

The synchronization command may include time information proportional to a delay amount calculated with reference to synchronization timing of a reference camera, and the command transmission unit may transmit the synchronization command.

The first, second, and third cameras may have a view angle of at least 150°, and have a rear axis of a symmetrical optical system in a downward direction at least 30° with respect to a horizontal direction, a straight running direction of the vehicle being located at an image height of at least 30° around an optical axis of each camera.

The vehicle state detection unit may determine a straight-running state of the vehicle, in accordance with data information about one or a combination of a global navigation satellite system (GNSS), global positioning system (GPS) data, a yaw rate sensor, a steering angle, and a change in an intersection point of detection line segments.

An image processing method of one aspect of the present technology is implemented by an image processing apparatus, and includes: detecting a straight-running state of a vehicle; detecting line segments from an image captured by a first camera, an image captured by a second camera disposed at a position on the opposite side of the vehicle from the first camera, and an image captured by a third camera different from both the first camera and the second camera; detecting an infinite point in a running background; calculating a correction amount of the first camera, in accordance with the detected infinite point; calculating a correction amount of the third camera, in accordance with the calculated correction amount of the first camera and the line segments detected by the line segment detection unit; and performing a correction process on a field angle of the first camera, in accordance with the correction amount of the first camera.

A program of one aspect of the present technology causes a computer to function as: a vehicle state detection unit that detects a straight-running state of a vehicle; a line segment detection unit that detects line segments from an image captured by a first camera, an image captured by a second camera disposed at a position on the opposite side of the vehicle from the first camera, and an image captured by a third camera different from both the first camera and the second camera; an infinite point detection unit that detects an infinite point in a running background; a first correction amount calculation unit that calculates a correction amount of the first camera, in accordance with the infinite point detected by the infinite point detection unit; a second correction amount calculation unit that calculates a correction amount of the third camera, in accordance with the correction amount of the first camera calculated by the first correction amount calculation unit and the line segments detected by the line segment detection unit; and a correction processing unit that performs a correction process on a field angle of the first camera, in accordance with the correction amount of the first camera.

An image processing system of another aspect of the present technology includes: a first camera, a second camera, and a third camera each including: an imaging unit that captures an image; and a transmission unit that transmits the image captured by the imaging unit, the first camera, the second camera, and the third camera being disposed on a body of a vehicle, the second camera being disposed at a position on the opposite side of the vehicle from the first camera, the third camera being different from both the first camera and the second camera; and an image processing apparatus including: a vehicle state detection unit that detects a straight-running state of a vehicle; a line segment detection unit that detects line segments from respective images captured by the first camera, the second camera, and the third camera; an infinite point detection unit that detects an infinite point in a running background; a first correction amount calculation unit that calculates a correction amount of the first camera, in accordance with the infinite point detected by the infinite point detection unit; a second correction amount calculation unit that calculates a correction amount of the third camera, in accordance with the correction amount of the first camera calculated by the first correction amount calculation unit and the line segments detected by the line segment detection unit; and a correction processing unit that performs a correction process on a field angle of the first camera, in accordance with the correction amount of the first camera.

In one aspect of the present technology, a straight-running state of a vehicle is detected, and line segments are detected from an image captured by a first camera, an image captured by a second camera disposed at a position on the opposite side of the vehicle from the first camera, and an image captured by a third camera different from both the first camera and the second camera. An infinite point in a running background is detected, and a correction amount of the first camera is calculated in accordance with the detected infinite point. A correction amount of the second camera disposed at a different position that is not located in the opposite direction of the first camera is calculated, in accordance with the calculated correction amount of the first camera and the detected line segments. A process of correcting the field angle of the first camera is performed, in accordance with the correction amount of the first camera.

In another aspect of the present technology, images are captured by a first camera disposed on the body of a vehicle, a second camera disposed at a position on the opposite side of the vehicle from the first camera, and a third cameral different from both the first camera and the second camera, and the respective captured images are transmitted. An image processing apparatus then detects a straight-running state of the vehicle, detects line segments from the images captured by the plurality of cameras, detects an infinite point in a running background, calculates a correction amount of the first camera in accordance with the detected infinite point, calculates a correction amount of the second camera disposed at a different position that is not located in the opposite direction from the first camera, and performs a process of correcting the field angle of the first camera in accordance with the correction amount of the first camera.

Effects of the Invention

According to the present technology, it is possible to detect a positional/directional shift of a camera during the vehicle is running.

It should be noted that the advantageous effects described in this specification are merely examples, and the advantageous effects of the present technology are not limited to them and may include some additional effects.

MODE FOR CARRYING OUT THE INVENTION

The following is a description of modes for carrying out the present disclosure (hereinafter referred to as embodiments). Meanwhile, explanation will be made in the following order.

1. First embodiment (an outline)
2. Second embodiment (a system)
3. Third embodiment (example applications)
4. Fourth embodiment (a personal computer)

1. First Embodiment (Outline)

[Outline of the Present Technology]

Figure 1:
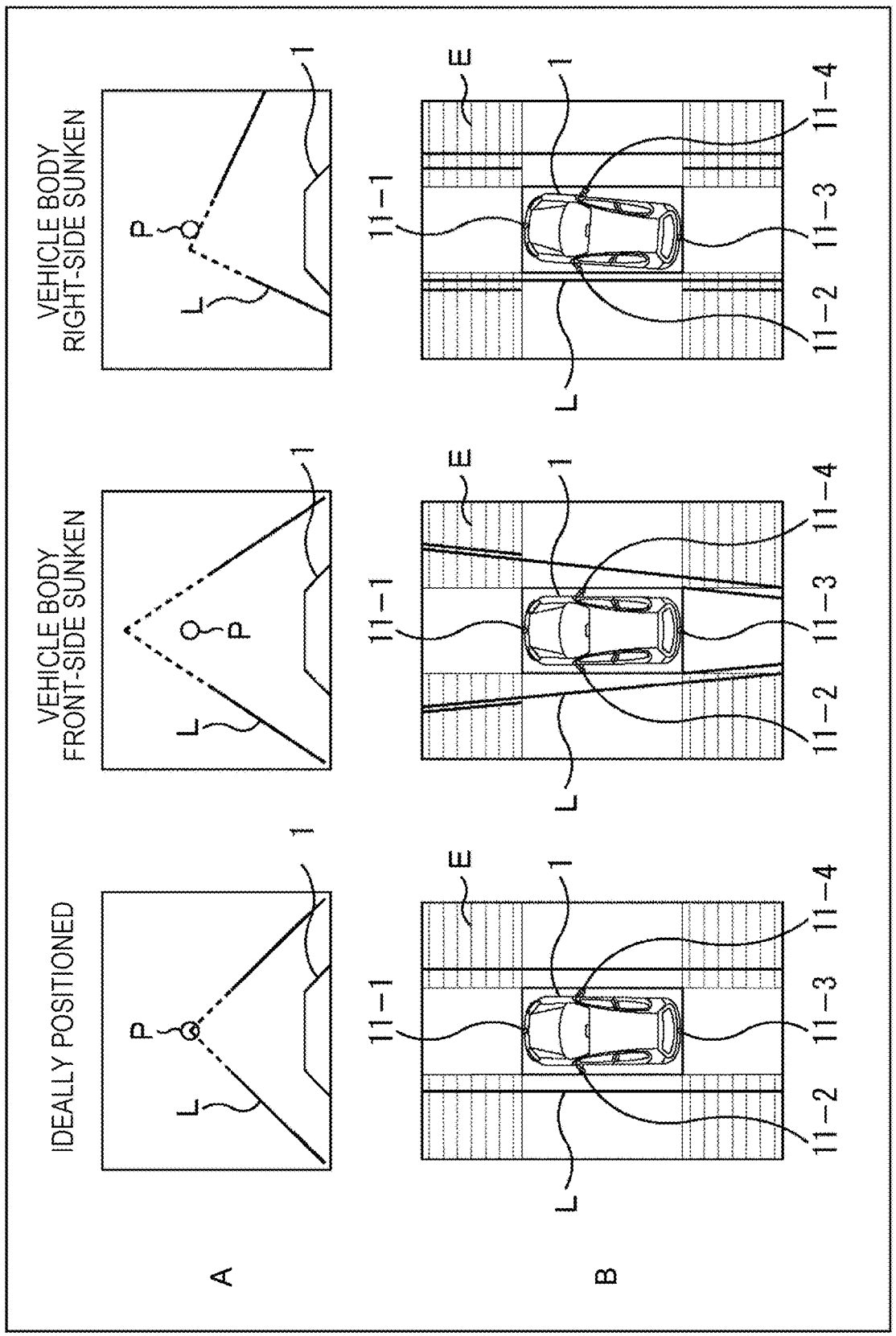
FIG. 1 shows diagrams for explaining an outline of a calibration process to be performed by a plurality of cameras according to the present technology.

Referring first to FIG. 1, an outline of a calibration process (calibration) to be performed by a plurality of cameras according to the present technology is described. A of FIG. 1 is diagrams showing camera images of an ideally positioned state, a vehicle body front-side sunken state, and a vehicle body right-side sunken state, in this order from the left. B of FIG. 1 is diagrams showing overhead images of an ideally positioned state, a vehicle body front-side sunken state, and a vehicle body right-side sunken state, in this order from the left.

In a vehicle, due to running, a change in the number of passengers, loading of baggage, the influence of inertial force generated by acceleration/deceleration of the vehicle, tilting of the vehicle when the vehicle travels on an uphill or downhill, the vehicle body might sink forward or rearward, or sink rightward or leftward, and the vehicle body height might change. This affects the effective field angle of a camera. To counter this, the present technology is designed to detect a positional shift of a camera and correct the shift even when the vehicle is running.

The camera images in A of FIG. 1 show the front portion of a vehicle body 1 in each state, the two lane lines L, and the running background vanishing point (infinite point) P. Here, a vanishing point is the point at which the straight lines on the screen plane corresponding to parallel lines converge when the parallel lines in a three-dimensional space are projected onto an image plane through perspective transform. In other words, a vanishing point is an "infinitely far point" on a planar image onto which a space having depth in reality is projected, and is recognized as the point at which extensions of lines parallel to each other in the depth direction intersect, or the point at which an extension of a plane extending in the depth direction converges at an infinite distance. Therefore, a vanishing point is also referred to as the infinite far point or the infinite point, and will be hereinafter also referred to as the point at infinity or the infinite point as appropriate.

In the example in A of FIG. 1, when the vehicle body 1 sinks to the front side, as opposed to the ideally positioned state, the convergence point (intersection point) of the two lane lines L deviates upward from the infinite point P. Also, when the vehicle body 1 sinks to the right side, as opposed to the ideally positioned state, the vehicle body rotates clockwise, and therefore, the line segment detected as an image rotates counterclockwise in accordance with the rotation of the vehicle body. Furthermore, if there is an orientational shift in the yaw direction of the vehicle body, the infinite point is displaced in accordance with the yaw angle. Therefore, the convergence point of the lane lines L horizontally moves to the left further from the infinite point P. The details of a "forward tilt" in which the vehicle body 1 sinks to the front side will be described later, with reference to FIG. 15 and later drawings.

Although not shown in the drawings, if the vehicle body 1 sinks to the rear side in a similar manner, as opposed to the ideally positioned state, and the lane lines L rotate to change the yaw direction, the convergence point shifts downward from the infinite point P. If the vehicle body 1 sinks to the left side, as opposed to the ideally positioned state, the convergence point of the lane lines L shifts rightward from the infinite point P. It should be noted that the rolling direction of the vehicle body does not change dramatically when running straight with a normal vehicle load quantity, but may change under a specific condition such as when the vehicle body is subjected to crosswind or further rotates in a forward/rearward tilted state.

The overhead images in B of FIG. 1 show the vehicle body 1 and the lane lines L in each state. In this example, a camera 11-1 (first camera) is disposed on a front portion of the vehicle body 1, a camera 11-2 (third camera) is disposed in the vicinity of the left side mirror of the vehicle body 1, a camera 11-3 (second camera) is disposed on a rear portion of the vehicle body 1, and a camera 11-4 (third camera) is disposed in the vicinity of the right side mirror of the vehicle body 1. Hereinafter, the camera disposed on a front portion will be referred to as the front camera, the camera disposed on a rear portion will be referred to as the rear camera, and the cameras disposed on the right and left sides will be referred to as the right camera and the left camera, respectively. Also, the right camera and the left camera will be collectively referred to as the right and left cameras where appropriate, and the front camera and the rear camera will be also referred to as the front and rear cameras where appropriate.

In the example in B of FIG. 1, when the vehicle body 1 sinks to the front side, the lane lines L widen in the front direction of the vehicle body 1, as opposed to the ideally positioned state in which the lane lines L are parallel, because the drawings have been subjected to overhead-view transform. Further, when the vehicle body 1 sinks to the right side, the lane lines L shift to the right while keeping the parallel state, as opposed to the ideally positioned state in which the lane lines L are parallel.

Although not shown in the drawings, if the vehicle body 1 sinks to the rear side in a similar manner, the lane lines L widen in the rearward direction of the vehicle body 1, as opposed to the ideally positioned state in which the lane lines L are parallel. If the vehicle body 1 sinks to the left side, the lane lines L shift to the left while maintaining the parallel state, as opposed to the ideally positioned state in which the lane lines L are parallel. It should be noted that, in a case where the front camera 11-1 is tilted forward by a predetermined amount, and the rear camera 11-3 is tilted rearward by the predetermined amount, for example, it is determined that the cameras are not in a displaced state but the vehicle body 1 is tilted.

Therefore, in the present technology, the front and rear cameras 11-1 and 11-3 detect a tilt from the positional relationship between the infinite point P and the lane lines L on a projection on the imaging screen on a straight road, and the tilt is then corrected. Here, a straight-running state can be obtained from steering wheel angle information (steering wheel information) from the vehicle, for example. Alternatively, a straight-running state can be detected from yaw rate information from a yaw rate sensor mounted on the vehicle, rotational speed difference information about the right and left tires, vehicle location information generated by a GPS, or the like. Also, in the ideally positioned state in which the vehicle is running along parallel lane lines on a flat ground, all the lane lines L converge (intersect) at the vanishing point P, and thus, a shift amount can be detected from camera images, and be corrected.

Further, in the present technology, the left and right cameras 11-2 and 11-4 perform correction through matching among the image portions (the shaded portions at the four corners) E that overlap the front and rear cameras 11-1 and 11-3 in the overhead images in B of FIG. 1. Here, corrected camera images of the front and rear cameras 11-1 and 11-3 are used as references.

More specifically, an orientational shift check on each of the front and rear cameras and alignment calibration as necessary are first performed.

An orientational shift of cameras may be a longitudinal shift in the running direction, a lateral shift, or rotation. Also, between the front and rear cameras, it is known that the intersection of extensions of parallel lines detected in the running direction of the running vehicle coincides with the running direction on the screen. Therefore, on the assumption that the vehicle does not continue to turn in a specific rotational direction, a vertical pitch shift and a horizontal yaw shift can be subjected to parameter calibration on the basis of the stable center over time. However, this stable center over time is not applicable in circuit running or the like in which the vehicle runs around in a certain direction such as a test course. Therefore, an exclusion process is performed where appropriate.

On the other hand, the rotational (roll) component and the vehicle height parameter of a camera with respect to the vehicle running direction both appear as changes in the angle θ formed by the perpendicular from the infinite point and a detection line segment L, and it is not possible to detect a shift amount only from the orientation on the screen on which parallel line segments in the travelling direction of the running vehicle are detected.

Therefore, a check is made to determine whether line segment extensions of road parallel line segments such as detection white lines have been detected simultaneously by a plurality of cameras. After that, road white lines recognized by two or more cameras in the vehicle running direction are overlapped on continuous monotonous connections (the quadratic differential of the line segments is 0, and there are no rapid discontinuous curvature connections) in adjacent synchronous images at the same time.

In a case where overhead-view transform is performed, distortion is normally corrected from an image having distortion as a fisheye lens, and distortion correction transform is performed on the assumption that the projection plane exists on a virtual road surface as an overhead image of a pseudo rectilinear projected image (a central projection transformed image, or an image without distortion). In the case where the estimated center of the original fisheye optical axis center is deviated, a linear line segment on the plane is not projected onto a straight line segment due to shifts of the camera internal parameters. In the case of parameter calibration of the right and left cameras attached to the right and left sides of the vehicle body, if a straight line segment originally does not coincide with a straight line, this lens has been shifted, and therefore, the internal parameters for calibrating the optical axes of the cameras 11 are corrected. However, the parameters determined simply by the posture of the vehicle body are normally the correction parameters that determine the relationship between the cameras 11 and the road surface, and the camera internal parameters are corrected with the correction parameters Also, the positions of the right and left cameras are corrected so that the vehicle running direction position of a shape recognition pattern on a specific captured road surface is the same in the synchronous images described above. Specifically, timing adjustment is performed so that the position in the vehicle running direction of a shape recognition pattern on a specific captured road surface can be captured at the same timing in the synchronous images described above. If images are in such a situation that there is a gap in the timing of capturing due to movement in the running direction, the position of a road surface image is corrected in accordance with the vehicle speed, and the movement amount is corrected in the running direction.

Furthermore, in a case where the lane width can be detected by the front camera, and the lane width can also be detected by the following camera, the lane width detected by the front camera is corrected to match the lane width detected by the following camera. Moreover, since simultaneous lane width detection cannot be performed by the front and rear cameras, the lane width detected by the front camera is corrected to be the same as the lane width detected at a predicted passage time after the vehicle passes. Here, the lane width refers to the distance component that separates the vehicle from the detection white lines, and is perpendicular to the running direction.

With the above configuration, the present technology can correct calibration shifts of the camera position parameters due to the running vehicle posture that changes with the loading condition of the vehicle and the like in each itinerary.

Also, calibration is conventionally performed in a stationary state, and therefore, there is no need to maintain synchronization between cameras. However, to realize the above described camera positional shift correction while the vehicle is running, it is necessary to compare images captured by the cameras 11 at the same time. In view of the above, an outline of calibration to be performed by a plurality of cameras according to the present technology is now described, with reference to FIG. 2.

[Camera Calibration System]

Figure 2:
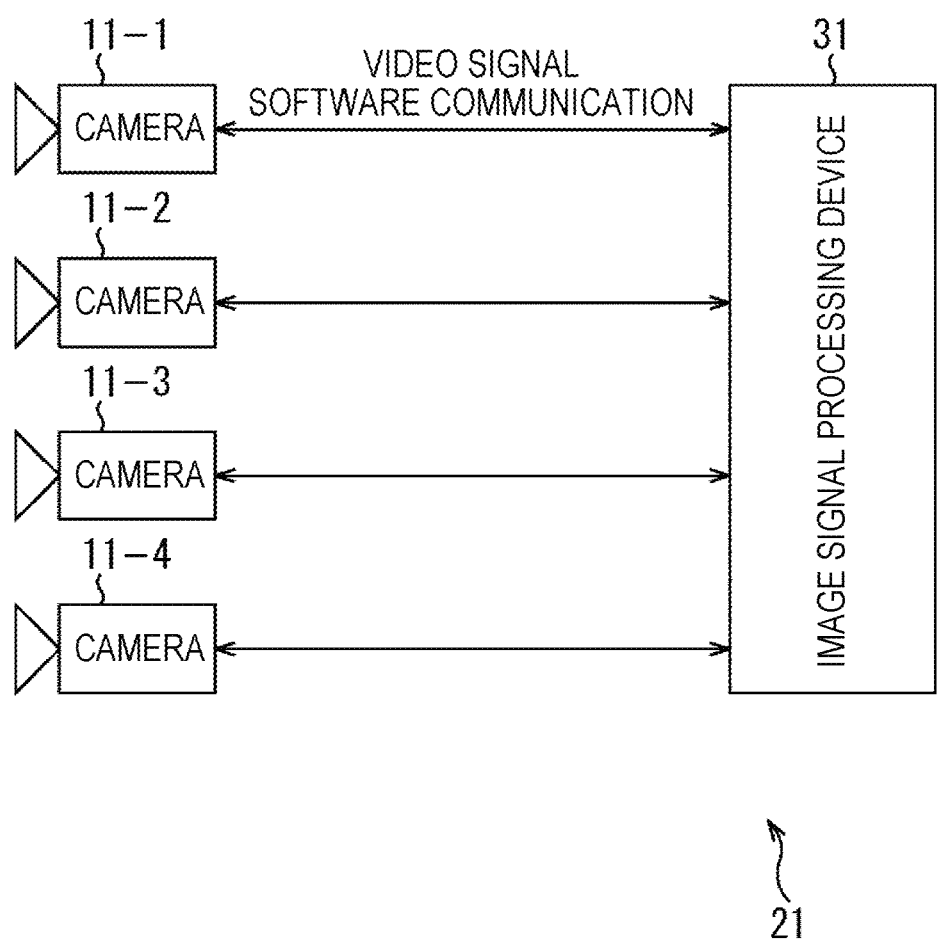
FIG. 2 is a block diagram showing an example configuration of a camera calibration system according to the present technology.

The example in FIG. 2 shows a camera calibration system to which the present technology is applied. The camera calibration system 21 includes the cameras 11-1 through 11-4 and an image signal processing device 31. In the example in FIG. 2, the number of cameras is four. However, the number of cameras may be any number as long as there are a plurality of cameras.

The cameras 11-1 through 11-4 are cameras that operate with independent oscillation, for example. The cameras 11-1 through 11-4 have a viewing angle of 150 degrees or larger, have the rear axes of the symmetric optical systems shifted downward by 30 degrees or more from the horizontal line, and are disposed at the respective positions of the vehicle body 1 shown in B of FIG. 1. Moreover, in the cameras 11-1 through 11-4, for example, the orientation of the vehicle in the straight running direction is located at an image height of 30 degrees or greater around the optical axes of the cameras. The cameras 11-1 through 11-4 perform imaging, and send the respective captured image signals to the image signal processing device 31 via video signal lines. Hereinafter, the cameras 11-1 through 11-4 will be collectively referred to as the camera 11 unless there is a particular need to distinguish them from one another.

The camera 11 receives a command (a synchronization shift amount) from the image signal processing device 31, controls the vertical blanking of the next frame or the frame after the next or the like in accordance with the received synchronization shift amount, and then outputs an image signal to the image signal processing device 31. In a case where the vertical blanking of the frame after the next is controlled, there is a need to perform integral accumulation adjustment.

The image signal processing device 31 detects a synchronization shift amount by extracting a frame start pulse from the image signal, for example, and transmits the detected synchronization shift amount as a control command signal to the camera 11 through superimposed downlink communication via a video signal line.

[Processes in the Camera Calibration System]

Figure 3:
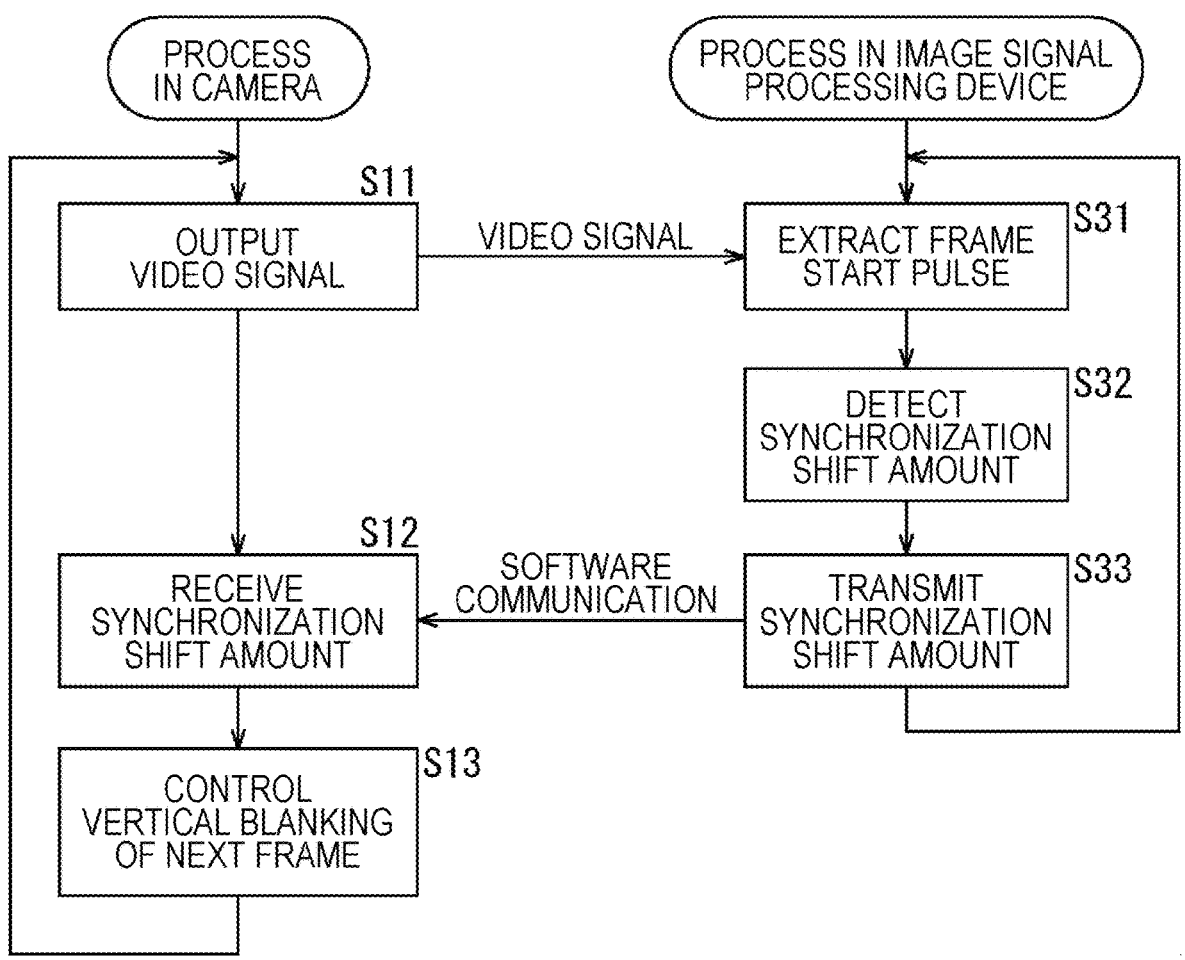
FIG. 3 is a flowchart for explaining processes in the camera calibration system shown in FIG. 2.

Referring now to the flowchart in FIG. 3, processes in the camera calibration system shown in FIG. 2 are described.

The camera 11 performs imaging, and, in step S11, outputs a video signal to the image signal processing device 31 via the video signal line. The image signal processing device 31 extracts a frame start pulse in step S31, and detects a synchronization shift amount in step S32. In step S33, the image signal processing device 31 transmits the detected synchronization shift amount as a command to the camera 11 through downlink communication superimposed on the video signal line. After that, the process returns to step S31, and the procedures thereafter are repeated.

The camera 11 receives the synchronization shift amount in step S12, and controls the vertical blanking of the next frame in step S13. After that, the process returns to step S11, and the procedures thereafter are repeated. It should be noted that the calibration process is not necessarily performed for every frame, and may be executed only in a case where the delay amount exceeds a predetermined threshold value. As such a threshold value is set, the process load can be reduced.

As described above, according to the present technology, in a case where a delay or the like is caused in each camera operating with independent oscillation, delay information is delivered to the video signal line through superimposed downlink communication, timing is corrected with a command, and the operation is continued.

Accordingly, the present technology can enable the cameras to perform imaging at the same time, and the captured images can be compared with one another. Thus, camera positional shift correction can be performed even while the vehicle is running.

These techniques will be described below in greater detail.

2. Second Embodiment (System)

[Specific Example Configuration of a Camera Calibration System of the Present Technology]

Figure 4:
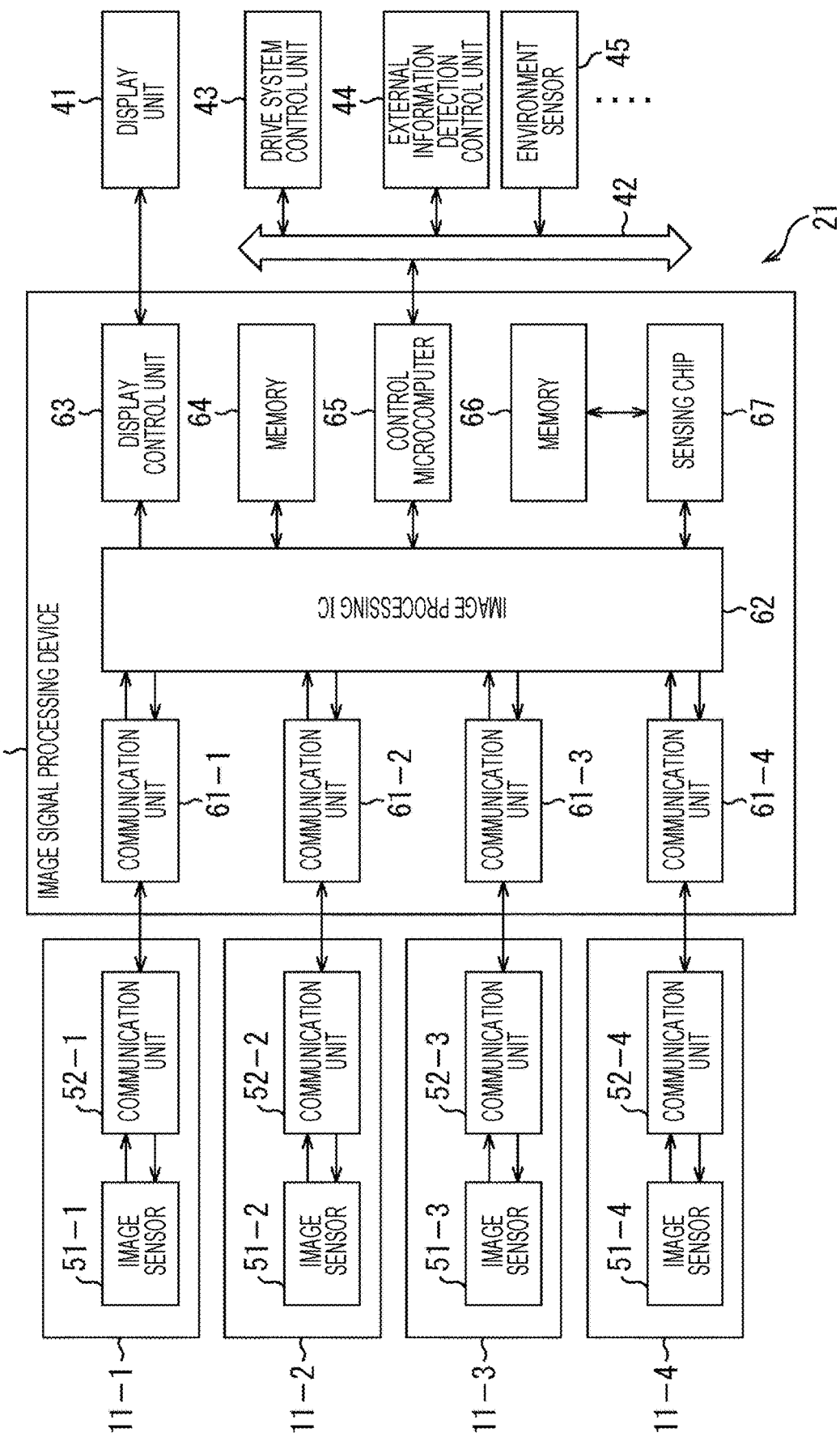
FIG. 4 is a block diagram showing a specific example configuration of a camera calibration system.

FIG. 4 is a block diagram showing a specific example configuration of a camera calibration system as an image processing system to which the present technology is applied. The camera calibration system 21 is a system mounted on a vehicle.

In the example shown in FIG. 4, the camera calibration system 21 includes not only the cameras 11-1 through 11-4 and the image signal processing device 31 shown in FIG. 2, but also a display unit 41, a communication network 42, a drive system control unit 43, an external information detection unit 44, and an environment sensor 45.

The cameras 11-1 through 11-4 are formed with image sensors 51-1 through 51-4 and communication units 52-1 through 52-4, respectively. The cameras 11-1 through 11-4 output image signals corresponding to images acquired by the image sensors 51-1 through 51-4, respectively, to the image signal processing device 31, and control the vertical blanking of the next frame in accordance with a command (including a synchronization shift amount) received from the image signal processing device 31. In this manner, the cameras 11-1 to 11-4 are synchronized with one another.

The image sensors 51-1 through 51-4 are formed with CMOS imaging devices, for example. The image sensors 51-1 through 51-4 perform predetermined camera signal processing on image signals corresponding to images acquired by photodiodes or the like, and output the processed image signals to the communication units 52-1 through 52-4.

The communication units 52-1 through 52-4 transmit the image signals from the image sensors 51-1 through 51-4 to the image signal processing device 31. The communication units 52-1 through 52-4 also receive a command sent from the image signal processing device 31.

The image signal processing device 31 includes communication units 61-1 through 61-4, an image processing IC 62, a display control unit 63, a memory 64, a control microcomputer 65, a memory 66, and a sensing chip 67. The image signal processing device 31 detects a synchronization shift amount by extracting a frame start pulse from image signals acquired from the cameras 11-1 through 11-4, and transmits the detected synchronization shift amount as a command to the cameras 11 through superimposed downlink communication via video signal lines.

The communication units 61-1 through 61-4 receive the image signals acquired from the cameras 11-1 through 11-4, and supply the image signals to the image processing IC 62. The communication units 61-1 through 61-4 transmit the detected synchronization shift amount as a command to the cameras 11 through superimposed downlink communication via the video signal lines.

Using the image signals from the communication units 61-1 through 61-4, the image processing IC 62 detects the synchronization shift amount from the cameras, and outputs the detected synchronization shift amount as a command to the communication units 61-1 through 61-4.

The image processing IC 62 also performs a calibration process on the cameras 11-1 through 11-4, using information obtained from the image signals from the communication units 61-1 through 61-4, sensing information from the sensing chip 67, information detected from the drive system control unit 43 and the like through the control microcomputer 65, and the image signals from the communication units 61-1 through 61-4. For example, the image processing IC 62 calibrates at least the orientations of the cameras 11-1 and 11-3 disposed at the front and the rear, in accordance with the infinite point in the running background. Using the correction values obtained through the orientation calibration, the image processing IC 62 generates overhead images of the respective cameras. Using the generated overhead images, the image processing IC 62 secures continuity between the line segments between the adjacent cameras, and checks the continuity of first derivation of the line segments with respect to the running direction. By doing so, the image processing IC 62 performs calibration on at least the cameras 11-2 and 11-4 disposed on the right and left sides. In this manner, calibration is performed on the cameras 11-1 through 11-4. The image processing IC 62 combines the calibrated image signals, and outputs the result to the display control unit 63.

It should be noted that, in addition to above two restraint conditions, an angle that rotates about the running direction of the vehicle, or a so-called roll angle, shows substantially uniform rotation characteristics in opposite directions from each other at the front and rear cameras 11-1 and 11-3 disposed in the travelling direction, on the assumption that the vehicle body has rigidity.

The display control unit 63 causes the display unit 41 to display an image corresponding to combined image signals that have been calibrated by the image processing IC 62 and been subjected to overhead-view transform and image combining in accordance with the internal parameters of the respective cameras 11 and external parameters. The memory 64 stores temporary data of the image processing IC 62.

The control microcomputer 65 receives information from the drive system control unit 43, the external information detection unit 44, and the environment sensor 45 of the vehicle via the communication network 42, and supplies the information to the image processing IC 62. The memory 66 temporarily stores the sensing information obtained by the sensing chip 67. The sensing chip 67 is formed with a distance measuring sensor or the like, for example, and supplies a result of distance measurement carried out with a GPS signal from the a global positioning system (GPS) satellite and GPS data to the image processing IC 62.

The display unit 41 is an LCD or the like mounted on a car, and displays an image corresponding to an image signal from the display control unit 63.

The drive system control unit 43 controls operations of devices related to the drive system of the vehicle in accordance with various programs, and transmits information obtained from the devices related to the drive system of the vehicle (such as the information being a gyro sensor that detects an angular velocity of axial rotation motion of the vehicle body, an acceleration sensor that detects an acceleration of the vehicle, an operation amount of the gas pedal, an operation amount of the brake pedal, a steering angle of the steering wheel, a sink amount of the suspension, information from the pitch sensor, and a sensor for detecting an engine speed or wheel rotation speed, for example) to the control microcomputer 65 via the communication network 42. For example, as the sink amount at the time of car rotation can be known from the sink amount of the suspension, an update process or the like may be performed as necessary.

The external information detection unit 44 detects information about the outside of the vehicle (such as an obstacle on a shoulder other than the road surface or a guardrail, for example), and transmits the information to the control microcomputer 65 via the communication network 42.

The environment sensor 45 transmits sensor information (such as a rain sensor or a snow sensor, for example) detected outside the vehicle to the control microcomputer 65 via the communication network 42.

It should be noted that, in the example shown in FIG. 4, only the drive system control unit 43, the external information detection unit 44, and the environment sensor 45 of the vehicle are shown in the communication network 42. In practice, however, other units of the vehicle are also connected to the communication network 42.

[Example Configuration of a Camera and the Image Processing IC]

Figure 5:
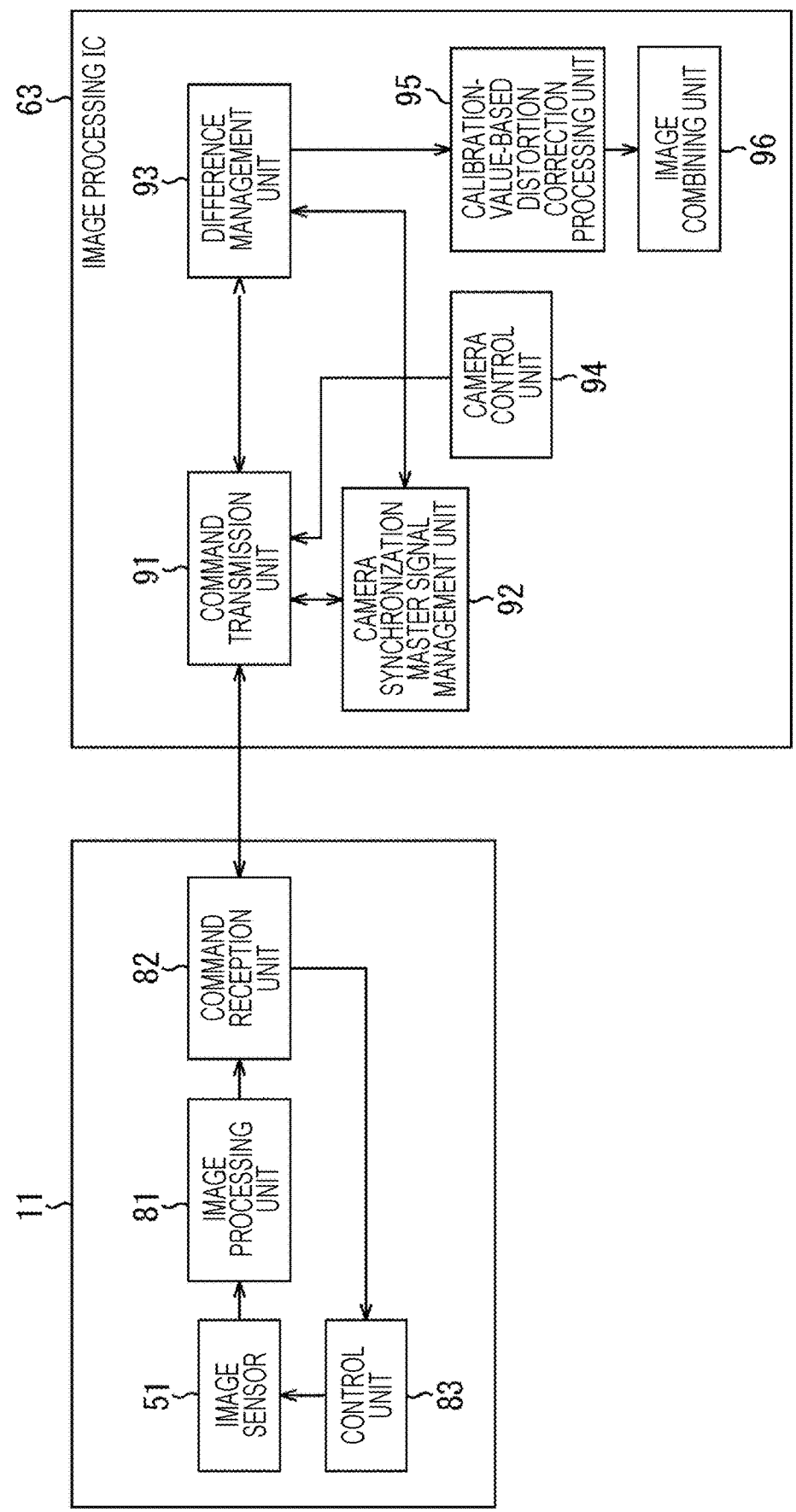
FIG. 5 is a block diagram showing specific example configurations of a camera and an image processing IC.

FIG. 5 is a functional block diagram showing specific example configurations of a camera and the image processing IC.

In the example shown in FIG. 5, the camera 11 includes an image sensor 51, an image processing unit 81, a command reception unit 82, and a control unit 83. An image signal from the image sensor 51 is input to the image processing unit 81. The image processing unit 81 performs predetermined signal processing on the image signal, and outputs the image signal subjected to the signal processing to the command reception unit 82.

The command reception unit 82 transmits the image signal from the image processing unit 81 to the image processing IC 62 via a video signal line. The command reception unit 82 also receives a command from the image processing IC 62, and supplies the received command to the control unit 83.

The control unit 83 resets the accumulation in the image sensor 51 or controls the readout timing, in accordance with the command from the command reception unit 82. Specifically, when the command reception unit 82 receives a master broadcast command, the control unit 83 performs an advancing/delaying process on the next frame timing of the image sensor 51 so as to have a constant delay with respect to the timing, and thus, sets the synchronization shift in the next frame to a specified value or smaller. In the case of the use method in which a certain master timing is notified to all the cameras by this broadcast method, it is not necessary to send an individual delay amount for each camera.

The image processing IC 62 includes a command transmission unit 91, a camera synchronization master signal management unit 92, a difference management unit 93, a camera control unit 94, a calibration-value-based distortion correction processing unit 95, and an image combining unit 96.

The command transmission unit 91 receives an image signal from a camera 11 via a video signal line, and transmits a command from the difference management unit 93 as individual difference information based on a delay amount to the camera 11 through downlink communication superimposed on the video signal line. The command transmission unit 91 outputs the timing of the received image signal to the camera synchronization master signal management unit 92 and the difference management unit 93.

The camera synchronization master signal management unit 92 analyzes the synchronization signal included in the image signal of each camera 11, to set a certain camera 11 or a reference master based on the camera 11. The camera synchronization master signal management unit 92 then supplies information about the set master to the difference management unit 93.

At that time, synchronous broadcast commands and individual synchronization commands are designed for image reception and preferential transmission of a synchronous command queue by the command transmission unit (Rx device) 91 in a preferential process.

In accordance with the master set by the camera synchronization master signal management unit 92, the difference management unit 93 analyzes the synchronization signal of each camera 11, or uses a dummy without analysis, to generate a blanking signal at the frame rate at which the difference from the master and the synchronization shift between the cameras 11 are managed, and supply a reference synchronization command to the command transmission unit 91 so as to periodically perform broadcasting to all the cameras at once. For example, the display timing is detected, and the difference management unit 93 detects a difference in display timing. The difference management unit 93 also generates feedback for each camera 11, and transmits the feedback to the command transmission unit 91. The difference management unit 93 transmits the image signals from the cameras 11 to the calibration-value-based distortion correction processing unit 95.

The camera control unit 94 supplies a command for controlling the cameras 11 to the command transmission unit 91, if necessary.

Using the image signal of the camera 11, the calibration-value-based distortion correction processing unit 95 performs a distortion correction process in accordance with the installation parameters for the cameras 11, or in accordance with the calibration value of the relative positional relationship with an assumed road surface, and supplies the resultant overhead image to the image combining unit 96. The image combining unit 96 combines the overhead images of the respective cameras 11 supplied from the calibration-value-based distortion correction processing unit 95, and outputs the combined overhead image to the display unit 41.

[Processes in the Camera Calibration System]

Figure 6:
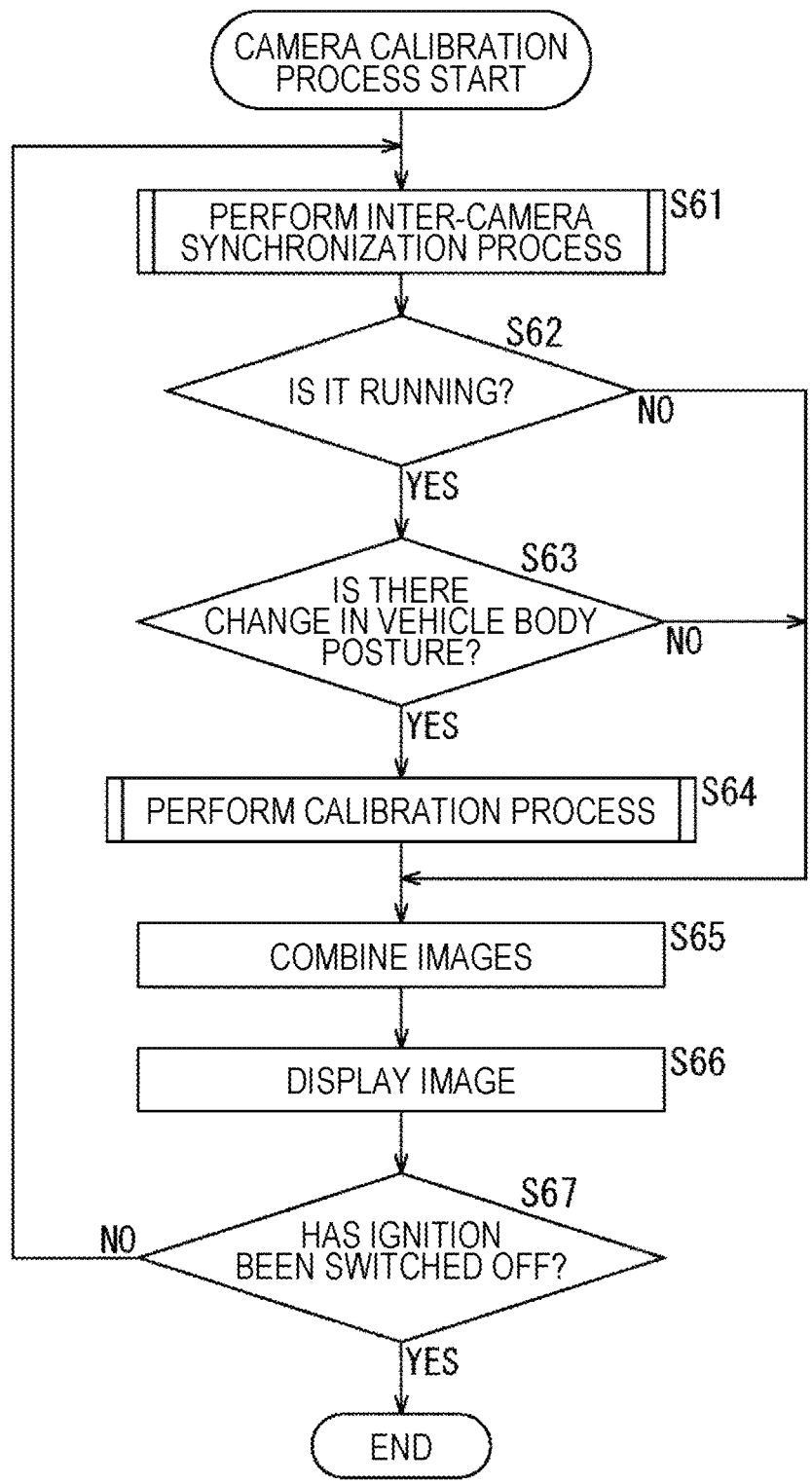
FIG. 6 is a flowchart for explaining a vehicle periphery overhead view display process in the camera calibration system.

Referring now to the flowchart in FIG. 6, a vehicle periphery overhead view display process in the camera calibration system 21 is described.

In step S61, the camera calibration system 21 performs a synchronization process between the cameras 11. The synchronization process between the cameras 11 will be described later in detail with reference to FIG. 7. Through this process in step S61, it is possible to synchronize the camera 11-1 disposed on a front portion the vehicle body 1, the camera 11-2 disposed in the vicinity of the left side mirror of the vehicle body 1, the camera 11-3 disposed on a rear portion of the vehicle body 1, and the camera 11-4 disposed in the vicinity of the right side mirror of the vehicle body 1.

In step S62, the control microcomputer 65 determines whether the vehicle is currently running, in accordance with information (the yaw rate sensor, an operation amount of the gas pedal, an operation amount of the brake pedal, a steering angle of the steering wheel, and the like) obtained from the drive system control unit 43. At this stage, the determination may be made only when the vehicle is running on a straight road. It should be noted that a check may be made to determine whether the vehicle is running and whether the vehicle is running on a linear trajectory, in accordance with the above described yaw rate sensor, an operation amount of the gas pedal, an operation amount of the brake pedal, a steering angle of the steering wheel, a global navigation satellite system (GNSS), surrounding environment information obtained from GPS data and recognized images, or data information that is formed with one or more pieces of map data and an intersection point variation of detection line segments. If it is determined in step S62 that the vehicle is currently running, the process moves on to step S63.

In step S63, the control microcomputer 65 further determines whether there is a change in the vehicle body posture, in accordance with the information obtained from the drive system control unit 43. Alternatively, though not shown in the drawing, a check may be made to determine whether there is a change in the vehicle body posture, in accordance with the existence/nonexistence of a shift of the infinite point of detection white lines, discontinuity of the same line segment between adjacent cameras, an increase in the secondary differential value of the line relative to the running axis (the line is not bent in the real space, but is bent at the time of overhead-view transform or combining), or the like. If it is determined in step S63 that there is a change in the vehicle body posture, the process moves on to step S64.

It should be noted that, after a check is made to determine whether the acceleration of the vehicle is equal to or lower than a predetermined value (whether the vehicle speed is stable), for example, a calibration process may be performed. If the acceleration of the vehicle is equal to or higher than the predetermined value, the change is a temporary fluctuation caused by the vehicle body tilting forward when the vehicle accelerates or decelerates, and it is not preferable to perform calibration with that value. Therefore, it is preferable to perform no fluctuation parameter calibration in this case.

In step S64, the calibration-value-based distortion correction processing unit 95 of the image processing IC 62 performs a camera calibration process. This camera calibration process will be described later with reference to FIG. 8. Through this process, at least the orientations of the cameras 11-1 and 11-3 are calibrated in accordance with the infinite point in the running background, overhead images of the respective cameras are generated with the use of correction values subjected to the orientation calibration, continuity of the line segments of adjacent cameras is maintained with the use of the generated overhead images, continuity of the first derivation in the running direction of the line segments is checked, and at least the camera 11-2 and the camera 11-4 are calibrated. In this manner, the cameras 11-1 through 11-4 are calibrated.

If it is determined in step S62 that the vehicle is not currently running, steps S63 and S64 are skipped, and the process moves on to step S65. If it is determined in step S63 that there is not a change in the vehicle body posture, step S64 is skipped, and the process moves on to step S65. In step S65, the image combining unit 96 of the image processing IC 62 combines the overhead images of the cameras 11-1 through 11-4 in accordance with the calibration values saved and stored in an internal parameter memory 130 for the cameras, and outputs the combined overhead image to the display control unit 63.

In step S66, the display control unit 63 displays the combined overhead image on the display unit 41.

In step S67, the image processing IC 62 determines whether the ignition of the vehicle has been turned off. If it is determined in step S67 that the ignition has not been turned off, or if it is determined that the vehicle remains in a running state, a vehicle load status detection process is performed as appropriate. The process then returns to step S61, and the procedures thereafter are repeated.

If the image processing IC 62 determines in step S67 that the ignition has been turned off, the vehicle periphery overhead view display process in the camera calibration system 21 is ended. It should be noted that the vehicle periphery overhead view display process in the camera calibration system 21 may be ended if idling is detected.

It should be noted that FIG. 6 shows an example in which the calibration process is performed only in a case where there is a change in the vehicle body posture while the vehicle is running. However, step S63 may be skipped, and the calibration process may be performed whenever the vehicle is running. Alternatively, the calibration process may be performed after baggage loading and unloading or after the door is closed, or may be performed when the vehicle power supply is turned on. That is, after the ignition is turned on, and baggage loading and passengers' getting in/out of the vehicle are completed, the suspension of the vehicle body does not greatly sink toward the road surface before a passenger gets in the vehicle or a change in the load occurs next time. In view of this, the calibration values may not be updated in accordance with information as to whether the door is opened/closed, or the like.

[Synchronization Process]

Figure 7:
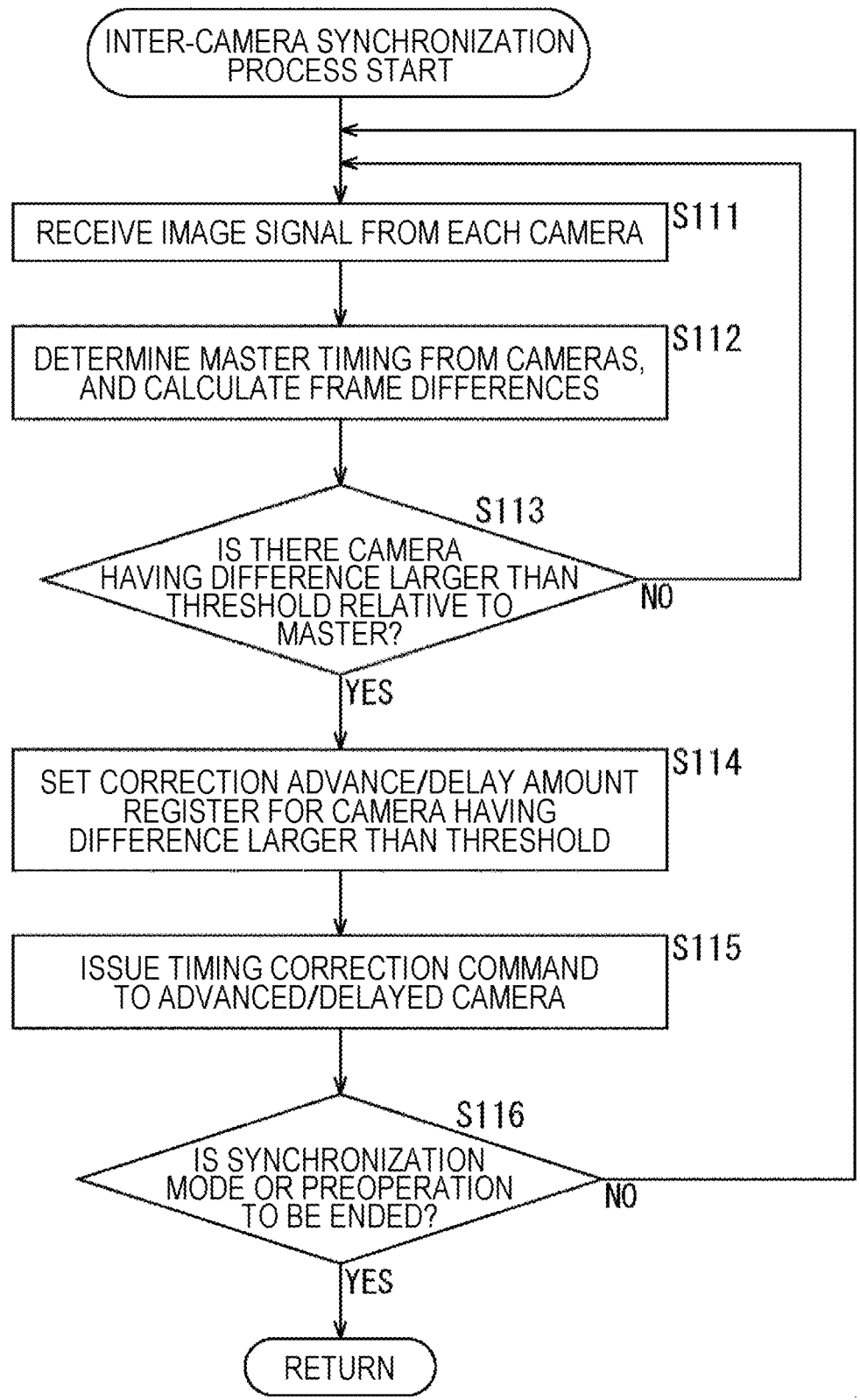
FIG. 7 is a flowchart for explaining an inter-camera synchronization process in step S61 in FIG. 6.

Referring now to the flowchart in FIG. 7, the inter-camera synchronization process in step S61 in FIG. 6 is described. It should be noted that, if there is hardly a difference in clock timing between the cameras 11, this process may be performed irregularly until a phase shift equal to or larger than a predetermined value is detected. Alternatively, this process may be performed regularly, or may be performed as the preprocessing for the calibration process so that the calibration process can be more accurately performed.

The cameras 11-1 through 11-4 perform imaging, and send the respective captured image signals to the image signal processing device 31 via video signal lines. In step S111, the command transmission unit 91 receives the image signals from the respective cameras 11, and outputs the received image signals to the camera synchronization master signal management unit 92 and the difference management unit 93.

In step S112, the camera synchronization master signal management unit 92 determines the master timing from the plurality of cameras 11, and the difference management unit 93 analyzes the synchronization signals of the respective cameras 11 and calculates frame timing difference information for the respective cameras 11 in accordance with the master timing determined by the camera synchronization master signal management unit 92.

In step S113, the difference management unit 93 determines whether there is a camera exceeding a difference threshold relative to the master. If it is determined in step S113 that there is a camera exceeding the difference threshold relative to the master, the process moves on to step S114.

In step S114, the difference management unit 93 sets a correction advance/delay register for the camera 11 exceeding the difference threshold. In step S115, a timing correction command for the fast/delayed camera (the camera exceeding the difference threshold) 11 is issued. The command transmission unit 91 transmits the timing correction command to the camera 11.

Meanwhile, in the camera 11, when the command reception unit 82 receives the transmitted command, the control unit 83 performs an advancing/delaying process on the next frame timing of the image sensor 51 with a certain delay amount relative to the timing, so that the synchronization shift in the next frame is limited to a specified value or smaller.

On the other hand, in the case of drive calibration in which the master signal management unit 92 uniformly broadcasts a constant reference synchronization signal to all the cameras at once, the control unit 83 performs unique determination of a delay between the reference synchronization signal and its own frame driving. The cameras 11 carry out actual discrimination, adjust the timing in accordance with a fixed advance/delay amount, and perform a timing calibration process for canceling a drift of the synchronization signal due to a clock fluctuation. In the example shown in FIG. 7, the former case where the timing correction command is transmitted to one camera 11 will be described below as a typical example.

In step S116, the difference management unit 93 determines whether to end the synchronization mode or the pre-operation for synchronizing the cameras 11. If it is determined in step S116 that the synchronization mode or the pre-operation for synchronizing the cameras 11 is not to be ended, the process returns to step S111, and the procedures thereafter are repeated.

If it is determined in step S113 that there is no camera 11 exceeding the difference threshold relative to the master, or in step S116, the synchronous mode or the pre-operation for synchronizing the cameras 11 is ended, and the inter-camera synchronization process comes to an end.

[Example Configuration of the Calibration-Value-Based Distortion Correction Processing Unit]

Figure 8:
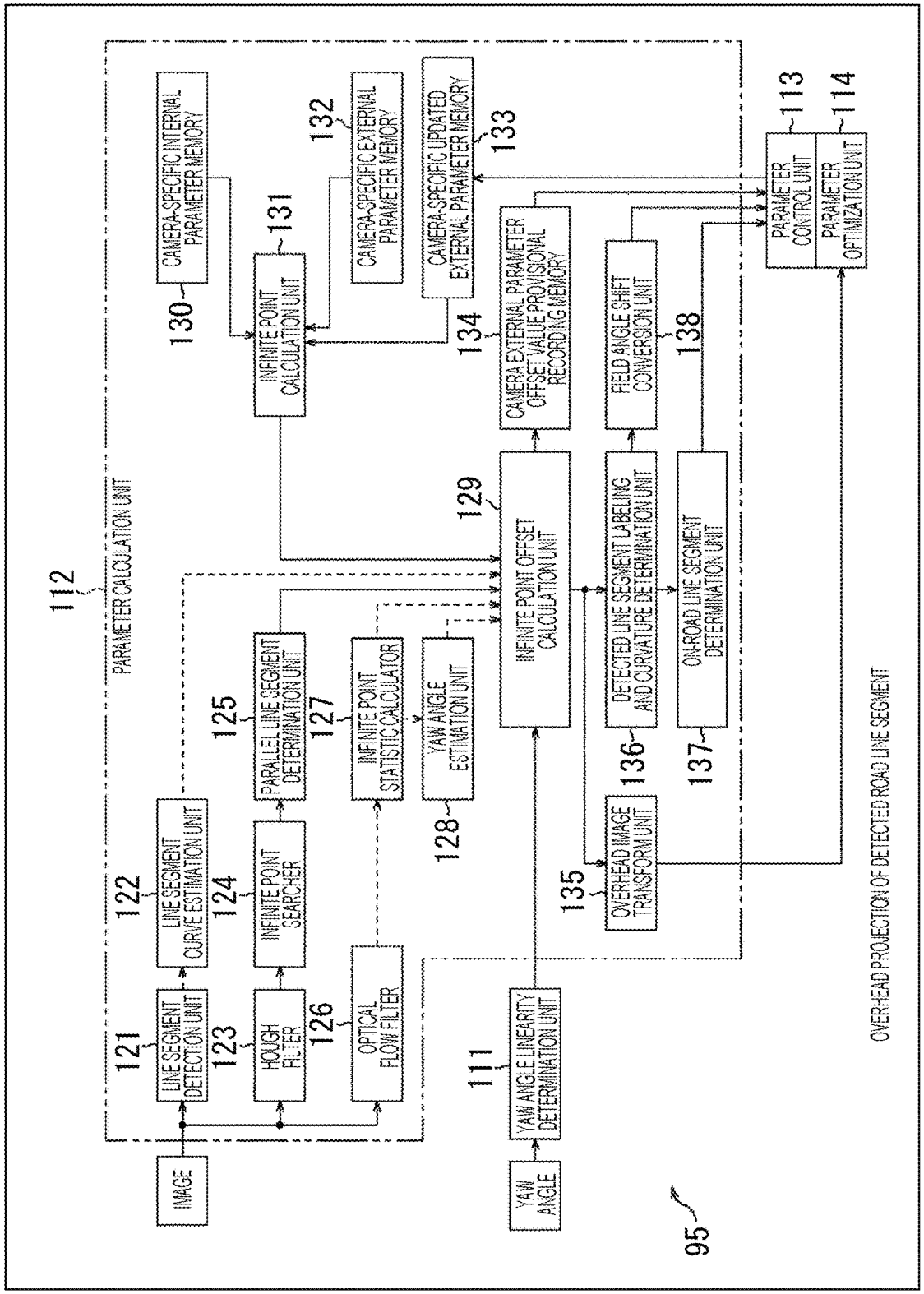
FIG. 8 is a block diagram showing an example configuration of a calibration-value-based distortion correction processing unit.

FIG. 8 is a block diagram showing an example configuration of the calibration-value-based distortion correction processing unit shown in FIG. 5.

In the example shown in FIG. 8, the calibration-value-based distortion correction processing unit 95 includes a yaw angle linearity determination unit 111, a parameter calculation unit 112, a parameter control unit 113, and a parameter optimization unit 114.

A yaw angle obtained from information about the yaw rate sensor, the steering wheel, and the like is input to the yaw angle linearity determination unit 111 via the control microcomputer 65. The yaw angle linearity determination unit 111 detects the state of the vehicle from the yaw angle. Specifically, in accordance with the yaw angle, the yaw angle linearity determination unit 111 determines whether the vehicle is running straight, and supplies the determination result to an infinite point offset calculation unit 129 of the parameter calculation unit 112.

From information detected from the images of the cameras 11, the parameter calculation unit 112 calculates a calibration parameter for rotation calibration for each camera, and calibrates the infinite point shift of each camera. As a result, the vertical pitch shift and the horizontal yaw shift are calibrated. The current calibration targets should include the front and rear cameras, but the right and left cameras may also be calibrated to achieve a higher degree of accuracy. In a case where the right and left cameras are the current targets to be calibrated, and parallel lines and infinite points fall within the view angles of the right and left cameras, the calibration parameters are calculated from the relationship between the two. Even if the infinite points are not included, the calibration parameters may be estimated from the parallel lines (the infinite points do not necessarily need to be included in captured images on the screen).

The parameter calculation unit 112 includes a line segment detection unit 121, a line segment curve estimation unit 122, a Hough filter 123, an infinite point searcher 124, a parallel line segment determination unit 125, an optical flow filter 126, an infinite point statistic calculator 127, a yaw angle estimation unit 128, and an infinite point offset calculation unit 129. The parameter calculation unit 112 also calculates an internal parameter memory 130 for each camera, an infinite point calculation unit 131, an external parameter memory 132 for each camera, an updated external parameter memory 133 for each camera, and a camera external parameter offset value provisional recording memory 134. The parameter calculation unit 112 further includes an overhead image transform unit 135, a detection line segment labeling and curvature determination unit 136, an on-road line segment determination unit 137, and a field angle shift conversion unit 138.

The line segment detection unit 121 to the camera external parameter offset value provisional recording memory 134 calculate the statistic stability point of the running direction infinite point, from the images of the previously provided cameras 11-1 through 11-4 (particularly the cameras 11 disposed at the front and the rear).

Specifically, the line segment detection unit 121 detects line segments from the images of the cameras 11, and supplies information about the detection line segments to the line segment curve estimation unit 122. The line segment curve estimation unit 122 estimates a curved line, not a straight line, from the information about the line segments, and outputs information about the estimated line segment curve to the infinite point offset calculation unit 129. It should be noted that, in a narrow sense, line segment detection is mainly for line segments as road marker lines that actually define the road boundaries, but in a broad sense, line segment detection is for the boundary lines that define the lane lines of the road. In that sense, line segments include line segments formed with shoulder curbs (shoulders), chatter bars called cat's eyes, and spline lines that connect boundaries defining lane boundary region definition lines that are not solid lines but are dotted lines, and are called "Botts' dots" or "Turtles" in California, USA.

The Hough filter 123 detects a straight line (such as a center line) from an image by performing Hough transform on the image, and supplies the detected straight line to the infinite point searcher 124. The infinite point searcher 124 searches for an infinite point from the straight line supplied from the Hough filter 123. The infinite point searcher 124 outputs the detected infinite point to the parallel line segment determination unit 125.

The parallel line segment determination unit 125 determines whether the detected straight line is a parallel line segment, and supplies the infinite point offset calculation unit 129 with the determination result, information about the straight line, and information about the infinite point.

The optical flow filter 126 detects the velocity at which a specific number of points on the object move between the time series image frames, and supplies information about the detected velocity to the infinite point statistic calculator 127. The infinite point statistic calculator 127 performs an infinite point statistic calculation in which the velocity becomes 0 during linear motion in the in-screen set of the velocity vector, and detects an infinite point. For example, a feature point detected above the horizontal line viewed from a mounted camera flows upward as the feature point becomes closer. A feature point detected below the horizontal line flows downward as the feature point becomes closer. On the left side in the running direction of the in-vehicle cameras, a detected feature point flows to the left as the vehicle runs forward. On the right side, on the other hand, a detected feature point flows to the right. This flow is called an optical flow. That is, an infinite point is the coordinate position where the vector of the optical flow is 0 in the distribution of the optical flow in the vector screen, and the infinite point statistic calculator 127 supplies the infinite point offset calculation unit 129 with information about the infinite point detected through the statistic calculation of the detected optical flow.

The infinite point offset calculation unit 129 calculates an offset shift amount (an updated parameter) of the infinite point with the detected infinite point and the saved default parameters, for each of the cameras (particularly the front and rear cameras) 11. In doing so, the infinite point offset calculation unit 129 uses an infinite point determined by one or more of the following methods: estimated by the line segment curve estimation unit 122; searched for by the infinite point searcher 124, and calculated by the infinite point statistic calculator 127, and the infinite point calculated by the infinite point calculation unit 131. The infinite point offset calculation unit 129 also performs calibration between the actual infinite point in the running direction and the assumed infinite point of the cameras 11. The shift amount between projected images of the center of the optical axis and the central projection in the running direction can be calculated by f*tan(θ), where θ represents the field angle shift amount, and f represents the focal length of the camera. It should be noted that this calculation will be described later in detail, with reference to FIGS. 13 and 14.

The infinite point offset calculation unit 129 supplies the calibrated updated parameters to the overhead image transform unit 135 and the detection line segment labeling and curvature determination unit 136, and also provisionally records the calibrated updated parameters on the camera external parameter offset value provisional recording memory 134. The reason why the offset values are only provisionally recorded while the external parameters 132 are not directly rewritten is that the detected offset values might be values specific to a temporary load on the vehicle load, and are highly unlikely to be calibration values in a steady state. Therefore, such offset values are not suitable for rewriting.

It should be noted that, in a case where the vehicle is running in parallel with the detected line, and an extension of the same lane line is also detected by the rear camera 11-3, the corresponding line segments are continuous, and therefore, are followed and detected by a following camera while the vehicle is running. The width from the vehicle to the detected line (this width is called the lane width in this example) matches between the front and rear cameras 11. Therefore, the external parameters of the cameras 11 are calibrated under the restraint condition. In a situation where the vehicle width cannot be detected by the front and rear cameras at the same time, the infinite point offset calculation unit 129 performs correction so that the lane width matches the lane width detected at a predicted passage time after passing of the lane width detected by the front camera 11-1. That is, correction is performed so that the lane width detected by the front camera 11-1 coincides with the lane width detected at the predicted passage time after passage of the camera field of the rear camera 11-3.

The internal parameter memory 130 for each camera stores the default values of the internal parameters (such as the focal length of the camera, an amount of distortion, and a shift of the optical axis of the optical system, for example) of the corresponding camera 11.

The infinite point calculation unit 131 reads the default values of the internal parameters for each camera 11 from the internal parameter memory 130 for each camera, reads the default values of the external parameters for each camera 11, reads the updated values of the external parameters for each camera 11, and calculates the infinite point in accordance with the read parameters. The infinite point calculation unit 131 supplies information about the calculated infinite point to the infinite point offset calculation unit 129.

The external parameter memory 132 for each camera stores the default values of the external parameters (such as the installation height from the road surface, the orientation/pitch of the optical axis with respect to the road surface, the yaw angle, the turn/rotation with respect to the road surface, for example) for each camera 11. The updated external parameter memory 133 for each camera stores the updated values of the external parameters for each camera 11, under the control of the parameter control unit 113.

The camera external parameter offset value provisional recording memory 134 provisionally records the updated parameters subjected to the orientation calibration as temporary data. Since it is a temporary state, provisional recording is performed, instead of replacement recording. This makes it possible to restore the parameters in the previous state. The timing to restore the parameters in the previous state is preferably a time when the door is opened/closed, for example. This is because there is a possibility that a passenger gets in/out or loading/unloading of baggage is performed when the door is opened/closed. In accordance with a door opening/closing operation detected by a sensor that detects opening and closing of the door, the offset value provisional recording memory 134 resets the temporarily recorded calibration parameters, and records new calibration parameters. It should be noted that the resetting of the calibration parameters is not only performed, for example, when the door is opened/closed, but may also be performed when a change in the seating position of a passenger is detected by an occupant position sensor.

The overhead image transform unit 135 transforms an image subjected to orientation calibration, and generates an overhead image. The overhead image transform unit 135 outputs the generated overhead image to the parameter optimization unit 114.

The line segment labeling and curvature determination unit 136 also uses steering angle (yaw angle) information in determining straight line segments and sections in the detection marker on the road, for example, and performs properness/improperness labeling as markers for calibration on the line segments, in accordance with image information obtained by the previously provided camera 11-1. The line segment labeling and curvature determination unit 136 also determines whether the linearity determination marker line segment has continuity in the cameras 11 disposed at the front and the rear. At this stage, image information about the detection line segments of at least two cameras 11 is compared and used.

It should be noted that the operations thereafter will be described later with reference to FIGS. 9 through 11. At this stage, the time series changes of the line segments (captured by the front and rear cameras 11) show that the boundary portions of the line segments parallel to the running direction of the running vehicle are always relatively constant even if the vehicle moves forward, and accordingly, do not change. On the other hand, of the detection line segments, the line segment in which a shift having a normal-direction component occurs is excluded from the calibration use, since the line segment indicates that it is not parallel to the running direction of the vehicle. Also, when the time series changes of the line segments and the yaw angle information about the vehicle are used together, and the running direction of the running vehicle does not change, the line segment in which a shift having a normal-direction component occurs is excluded from the detection line segments to be used for calibration. Further, when there is no change in the running direction of the running vehicle, and the line segment intersection points among a plurality of detection line segments fluctuate in time series from the time series changes in the detection line segments caused by the running of the vehicle, the line segments are excluded from calibration use. In other words, the convergence point of the line segments to be excluded from the calibration use is a pseudo vanishing point, and therefore, is excluded from the calibration use. It should be noted that a check may be made to determine whether there is a change in the running direction of the running vehicle, in accordance not only with the above described yaw angle information but also with steering angle information supplied from a steering angle sensor or tire turning angle information supplied from a tire turning angle sensor.

In a case where the line segment labeling and curvature determination unit 136 determines that the linearity determination marker line segments have continuity, the line segment labeling and curvature determination unit 136 outputs the labeled calibration parameters to the on-road line segment determination unit 137 and the field angle shift conversion unit 138. The on-road line segment determination unit 137 determines whether the linearity determination marker line segments are on the road surface. At that stage, height determination is also performed, and line segments extending in the height direction, such as curbstone, are excluded. The reason is that the actual height of the road surface is different from the image captured obliquely from a side at the time of overhead-view transform. The on-road line segment determination unit 137 supplies the discrimination result to the parameter control unit 113.

The field angle shift conversion unit 138 converts a positional shift (offset) into a field angle shift, and supplies the value of the converted field angle shift to the parameter control unit 113. As information about the value of the converted field angle shift is stored, it is possible to prevent errors even at distorted portions. It should be noted that the field angle shift converted by the field angle shift conversion unit 138 may be provisionally recorded in the camera external parameter offset value provisional recording memory 134. A field angle shift can be obtained by f*tan(θ), if the image is centrally projected with the infinite far point in the running direction as the optical axis. However, in the case of a distorted fisheye image, reference conversion or the like may be performed in accordance with a unique lookup table.

The parameter control unit 113 is formed with a CPU or the like, for example, and controls the use of the calibration parameters calculated by the parameter calculation unit 112 and the parameters optimized by the parameter optimization unit 114, and the recording in each memory.

The parameter optimization unit 114 is formed with a CPU or the like, for example, and optimizes the respective parameters to achieve line segment continuity between adjacent cameras 11 and achieve continuity among first differential values with the running direction as the variable axis of the line segments, using the calibration parameters supplied from the parameter control unit 113, with respect to images (which may or may not be overhead images) of the respective cameras 11 on detected road surface portions supplied from the parameter calculation unit 112. Through this optimization, the right and left cameras 11 are calibrated, and calibration of a rotational shift is performed.

Specifically, the parameter optimization unit 114 corrects the positions of the right and left cameras 11 so that the vehicle running direction in a shape recognition pattern on the specific captured road surface is the same between synchronous images of adjacent cameras 11. The parameter optimization unit 114 also corrects the parameters so that the first derivation of a detection line segment with respect to the running direction as the axis is the same between adjacent images. The line segments should not be bent between adjacent images, but should be continuous line segments. Alternatively, the parameter optimization unit 114 corrects the parameters so that the first derivation of a real space projection image of the same line segment (a line segment in an overhead transformed image) detected while the vehicle is running is the same between different camera images, with the running direction of the detection line segment being the axis.

It should be noted that, in the parameter optimization unit 114, the rotation parameters including the cameras 11 are calculated by three or more devices. In a case where changes in two or more of the parameters are minimum, and only the change in a specific camera is maximum, the installation varies due to an external factor such as a collision with the specific camera, and the possibility of influence of external parameters is determined to be high. It is not appropriate to change the other camera parameters with the parameter. In this case, the parameter calibration value of the specific camera is calibrated, and the values of the cameras with only small changes should be basically maintained as they are.

Further, in the parameter calculation unit 112, the portions indicated by dotted lines in FIG. 8 are functions that complement one another. There is no need to implement all the functions, and some functions may not be included.

Here, the vehicle runs parallel to the detection road white lines, and, of the time series behaviors of the captured images of central projections of line segments that are not parallel to the running vehicle, only the corresponding line segment can be moved parallel in a direction perpendicular to the same line segment. In a case where movement of a detection line segment in the perpendicular direction is recognized in a time series image by taking advantage of the characteristics, the intersection point between the line segment and any other line segment is not regarded as an infinite point in the running direction.

This will be described below, with reference to FIGS. 9 and 10.

Figure 9:
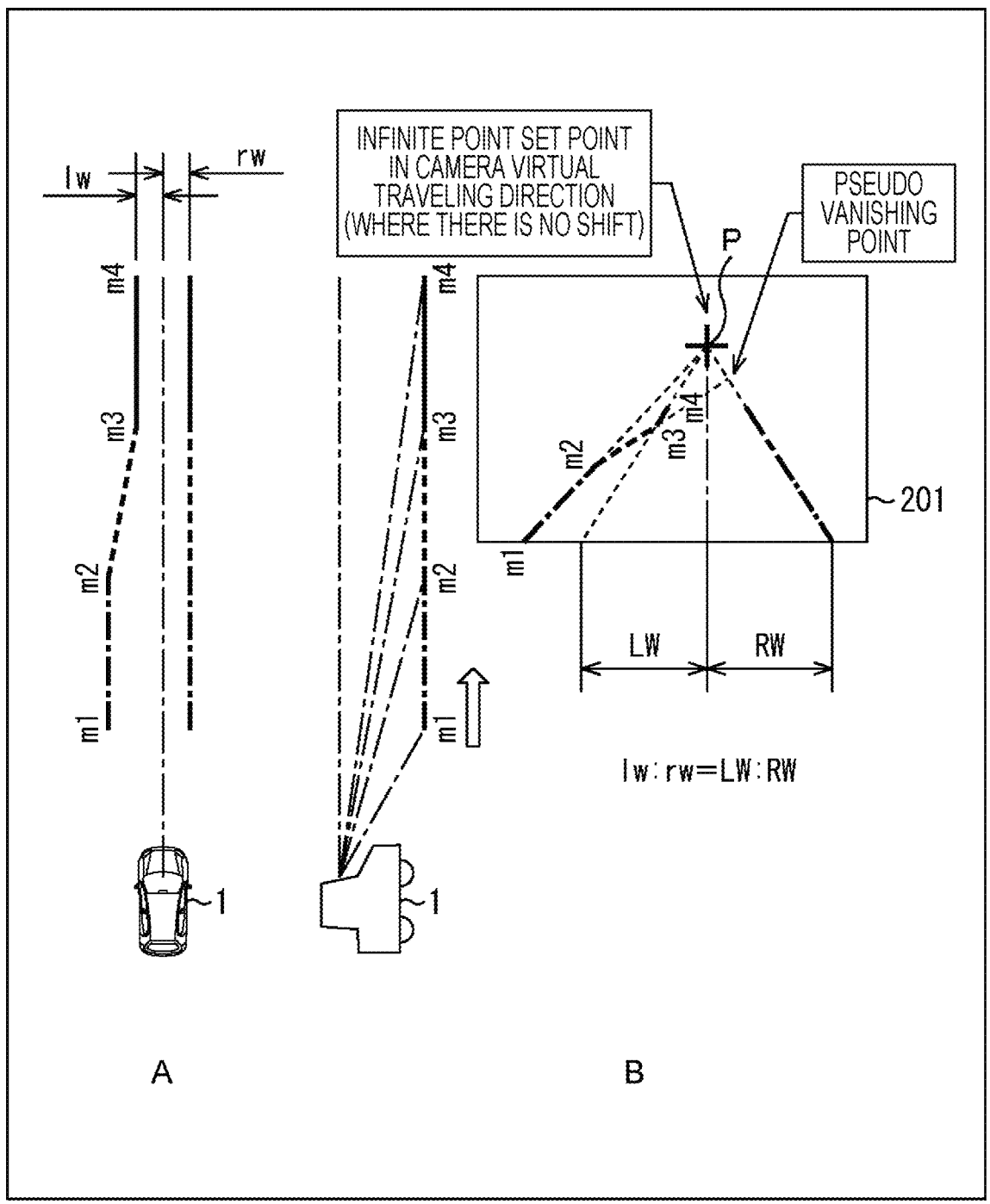
FIG. 9 is a diagram for explaining a detection line segment captured by a camera and a detection line segment in a camera image prior to movement of the vehicle.

FIG. 9 is a diagram showing detection line segments captured by a camera (the camera 11-1, for example) and detection line segments in a camera image prior to movement of the vehicle. A of FIG. 9 is a diagram showing detection line segments when the vehicle is viewed from above. B of FIG. 9 is a diagram showing the detection line segments when the vehicle is viewed from a side, and the detection line segments in a camera image.

It should be noted that, in the example shown in FIG. 9, the distance from the center position of the vehicle to the detection road white line on the left side is a distance lw, and the distance from the center of the vehicle to the detection road white line on the right side is a distance rw. Further, in a camera image 201, the distance from an infinite point set point (a provisional infinite point) P (where there is no shift) in a camera virtual running direction to the detection road white line on the left side is a distance LW, and the distance from the infinite point set point P to the detection road white line on the right side is a distance RW, where lw: rw=LW: RW. FIG. 10 is a diagram showing detection line segments captured by a camera (the camera 11-1, for example) and the detection line segment in a camera image after movement of the vehicle.

Figure 10:
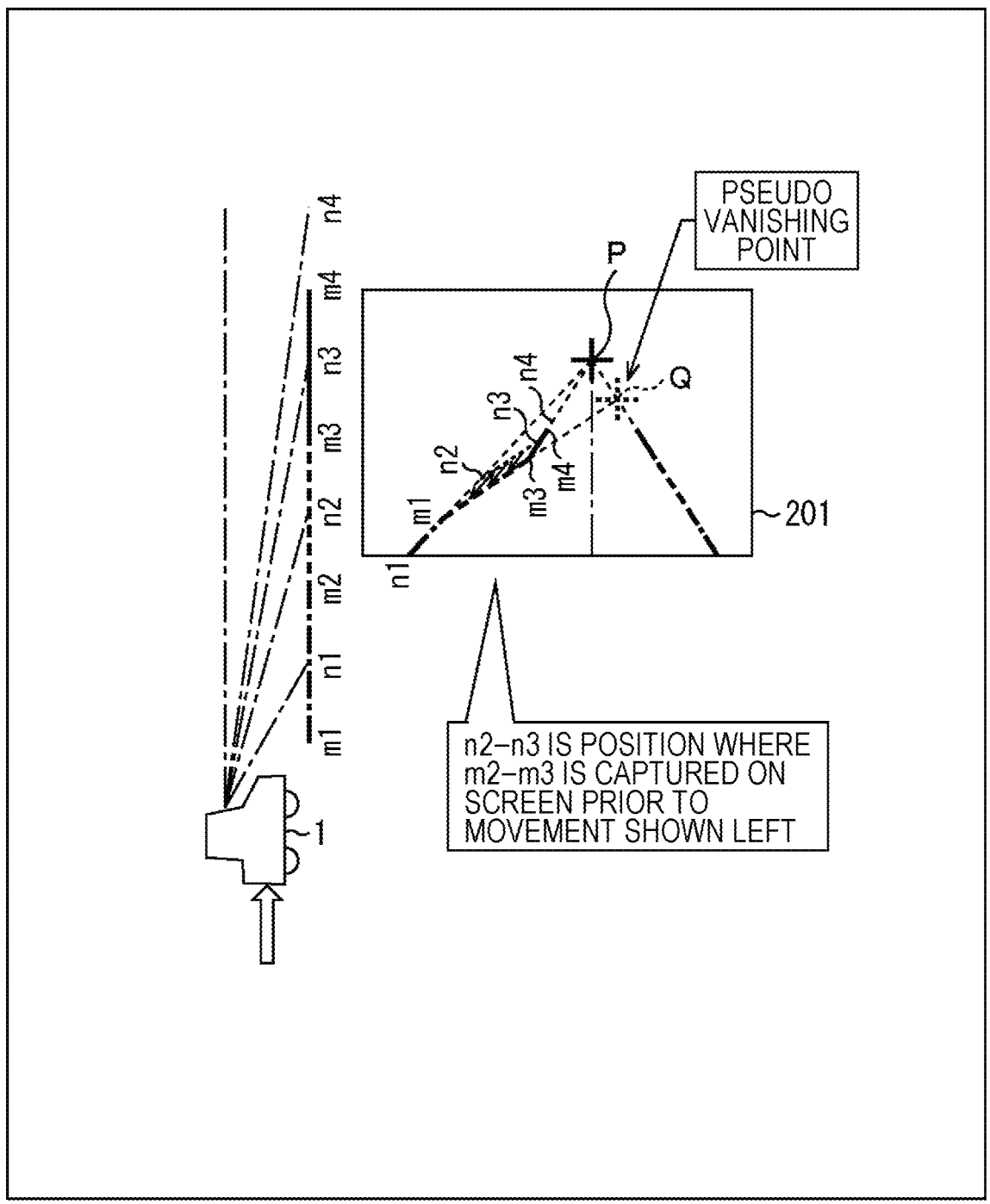
FIG. 10 is a diagram showing a detected line segment captured by the front camera and a detection line segment in a camera image after movement of the vehicle.

As shown in A of FIG. 9 and B of FIG. 9, in a straight forward direction of the vehicle (having the vehicle body 1) indicated by a dot-and-dash line, a line segment m2-m3 that is captured by the camera 11-1 and is not parallel to the vehicle running direction does not stay on the same line segment like a line segment m1-m2 or a line segment m3-m4 as the vehicle moves forward in the running direction to a position shown in FIG. 10, for example. The corresponding line segment in the camera image 201 shifts from the original line segment n2-n3. Here, the original line segment n2-n3 is the position where the line segment m2-m3 was captured in the camera image 201 prior to the movement shown in A of FIG. 9 and B of FIG. 9.

The point at which the straight line segments obtained from the camera image 201 intersect is a convergence point Q. However, a line segment shift occurs in time series images accompanying the movement. Therefore, lines that are not parallel to the running direction of the vehicle are included, and the convergence point Q becomes a pseudo vanishing point.

That is, a check on a line segment that is not parallel to the line segments parallel to the running direction of the vehicle can be made by determining whether a shift occurs so that such a line segment includes normal-direction components.

Figure 11:
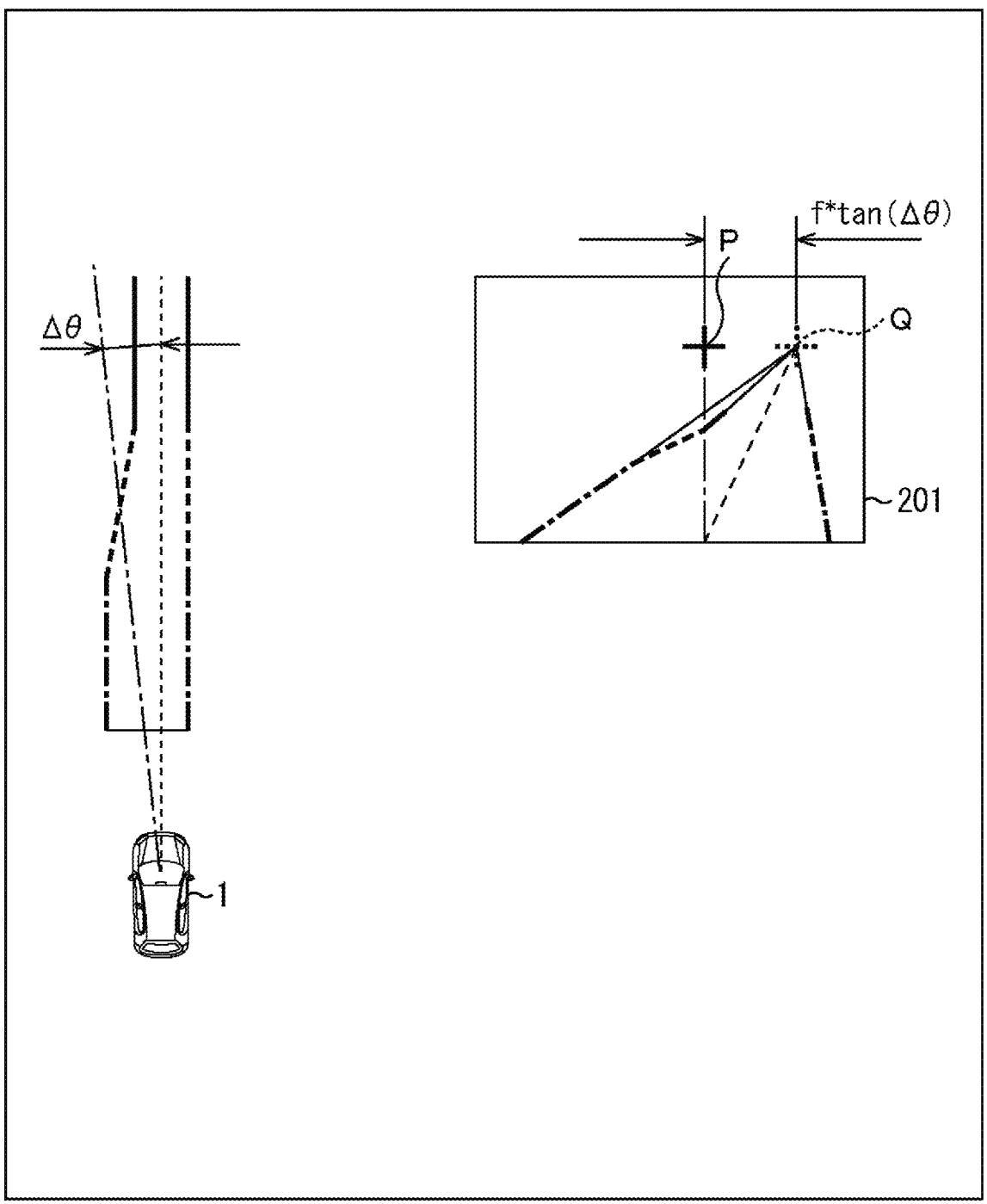
FIG. 11 is a diagram for explaining a method of calculating an angle shift amount of a camera image in a case where the orientation of the front camera laterally shifts by an angle $\Delta\theta$ with respect to the vehicle running direction.

Also, in a situation where the convergence point of vehicle running parallel lines can be obtained with line segment information obtained from the infrastructure environment, for example, if the orientation of the front camera (the camera 11-1) is at an angle of $\Delta\theta$ with respect to the running direction of the vehicle, the angle shift amount can be expressed as $f^*\tan(\theta)$ using the focal length f of the camera in the captured image at that time, as shown in FIG. 11.

Figure 12:
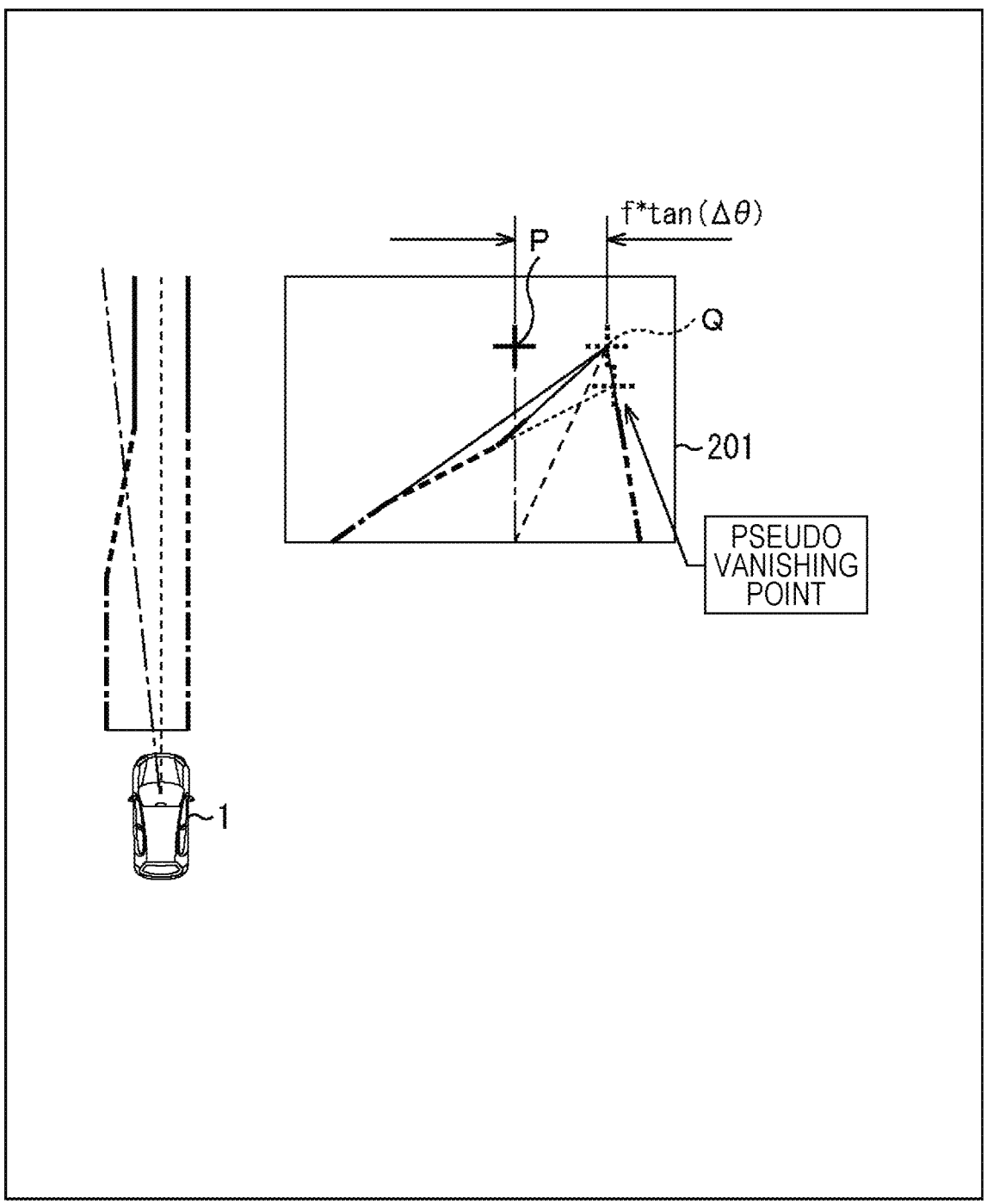
FIG. 12 is a diagram showing an example in which the convergence point of the running non-parallel components is a pseudo vanishing point.

The provisional infinite point P in the vehicle running direction based on the past camera calibration value indicated by a dot-and-dash line does not match the convergence point Q of the parallel line segments of the detected vehicle in the current running state. That is, the shift amount is expressed as $f^*\tan(\theta)$, and thus, the tilt angle $\Delta\theta$ can be obtained. On the other hand, as described above with reference to FIG. 10, the convergence point Q of the components that are not parallel to the running direction is a pseudo vanishing point, as shown in FIG. 12, and therefore, this point should not be used in calculating $\Delta\theta$. Therefore, in the vehicle, it is necessary to perform an exclusion process (a usage prohibition process) on the line segment described above with reference to FIG. 8.

Figure 13:
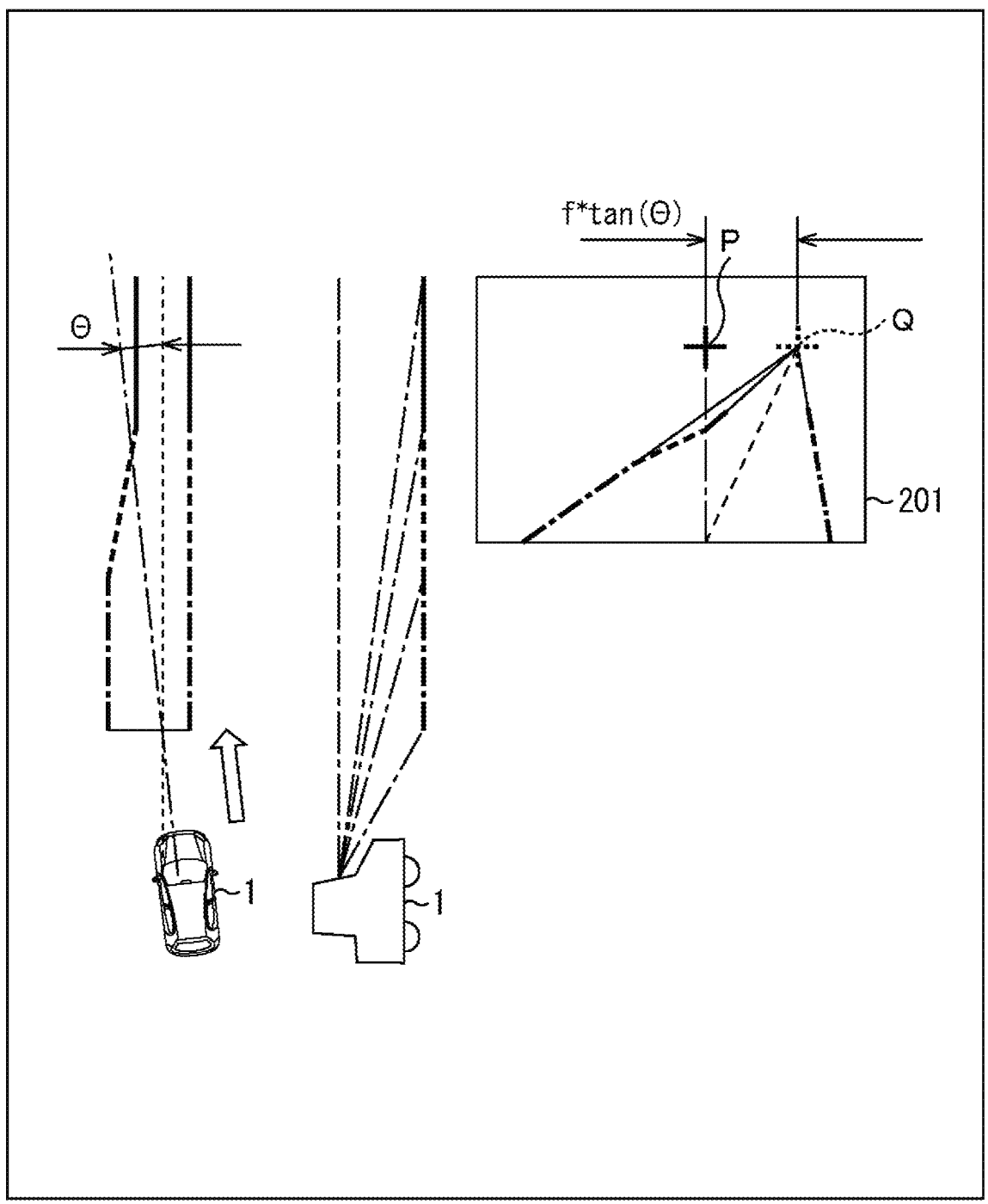
FIG. 13 is a diagram for explaining a case where the vehicle runs while tilting at an angle $\theta$ with respect to the road.
Figure 14:
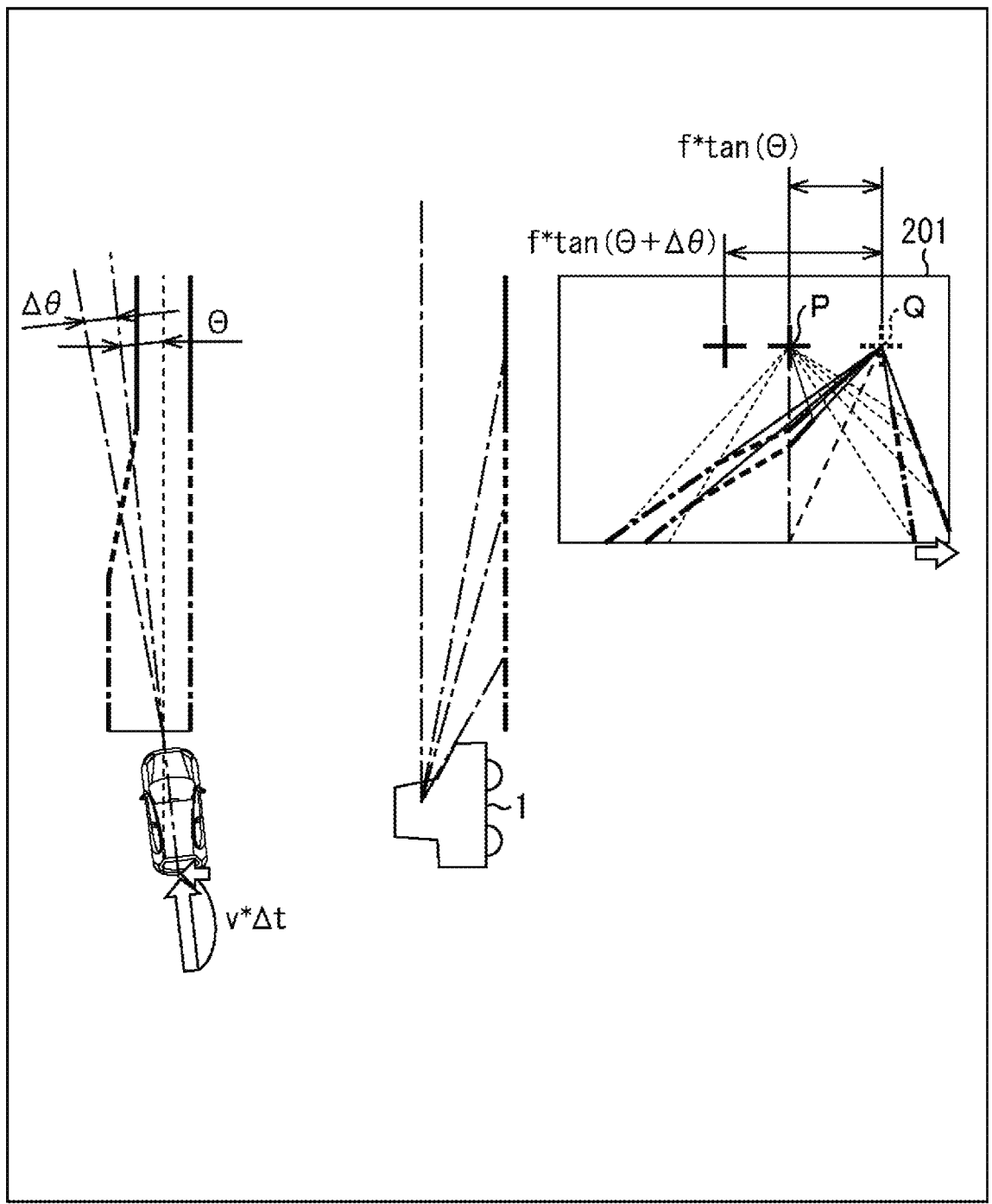
FIG. 14 is a diagram for explaining a case where the vehicle runs while tilting at angle $\theta$ with respect to the road.

Referring now to FIGS. 13 and 14, a case where the vehicle is tilted at an angle θ to the road while running is described.

As shown in FIG. 13, when a vehicle travels with a constant angle θ to parallel line segments (referred to as peripheral parallel line segments) in a peripheral recognizable environment such as a road, the running-direction infinite point P of a camera (the front camera, for example) mounted on the vehicle laterally shifts, by $f^*\tan(\theta)$, from a parallel line segment convergence point Q that is the intersection point of peripheral parallel line segments, in accordance with the focal length of the front camera.

In a case where the vehicle runs while being tilted the angle θ with respect to a plurality of parallel lines on which the vehicle is detected in the periphery, the infinite point of a camera mounted on the vehicle should shift by $f^*\tan(\theta)$ from the convergence point (intersection point) Q of the corresponding detection line segments and the screen corresponding to the angle θ.

In view of this, in a case where there is a shift of the angle θ from the lateral shift from the vehicle running direction and traveled distance information from vehicle-adjacent time series images of the cameras mounted on the vehicle, as shown in FIG. 14, if the angle θ is with respect to an infrastructure parallel line of a road or the like, the shift amount is detected as being shifted by $f^*\tan(\theta+\Delta\theta)$ as a captured image. Thus, $\Delta\theta$ can also be obtained from the value of θ obtained from the lateral shift of the vehicle in accordance with the traveled distance. It should be noted that, as for the traveled distance information, a traveled distance $v^*\Delta t$ can be acquired from the vehicle speed and wheel rotation information, and the lateral shift amount of the vehicle relative to the running direction of the parallel lines is detected from adjacent camera images. From the tangent, the angle θ can be obtained.

Figure 15:
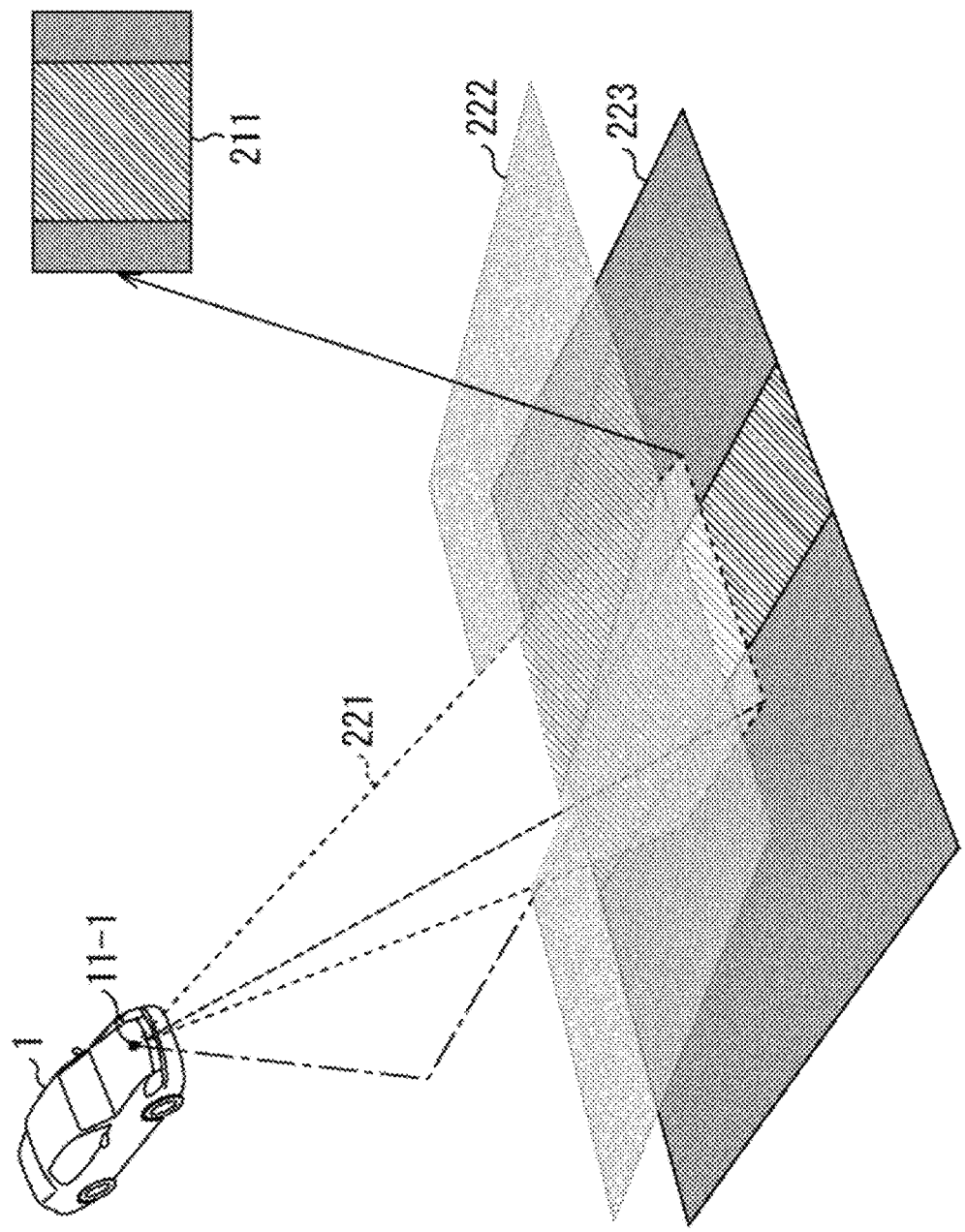
FIG. 15 is a diagram for explaining the details of a forward tilt of the vehicle body.
Figure 16:
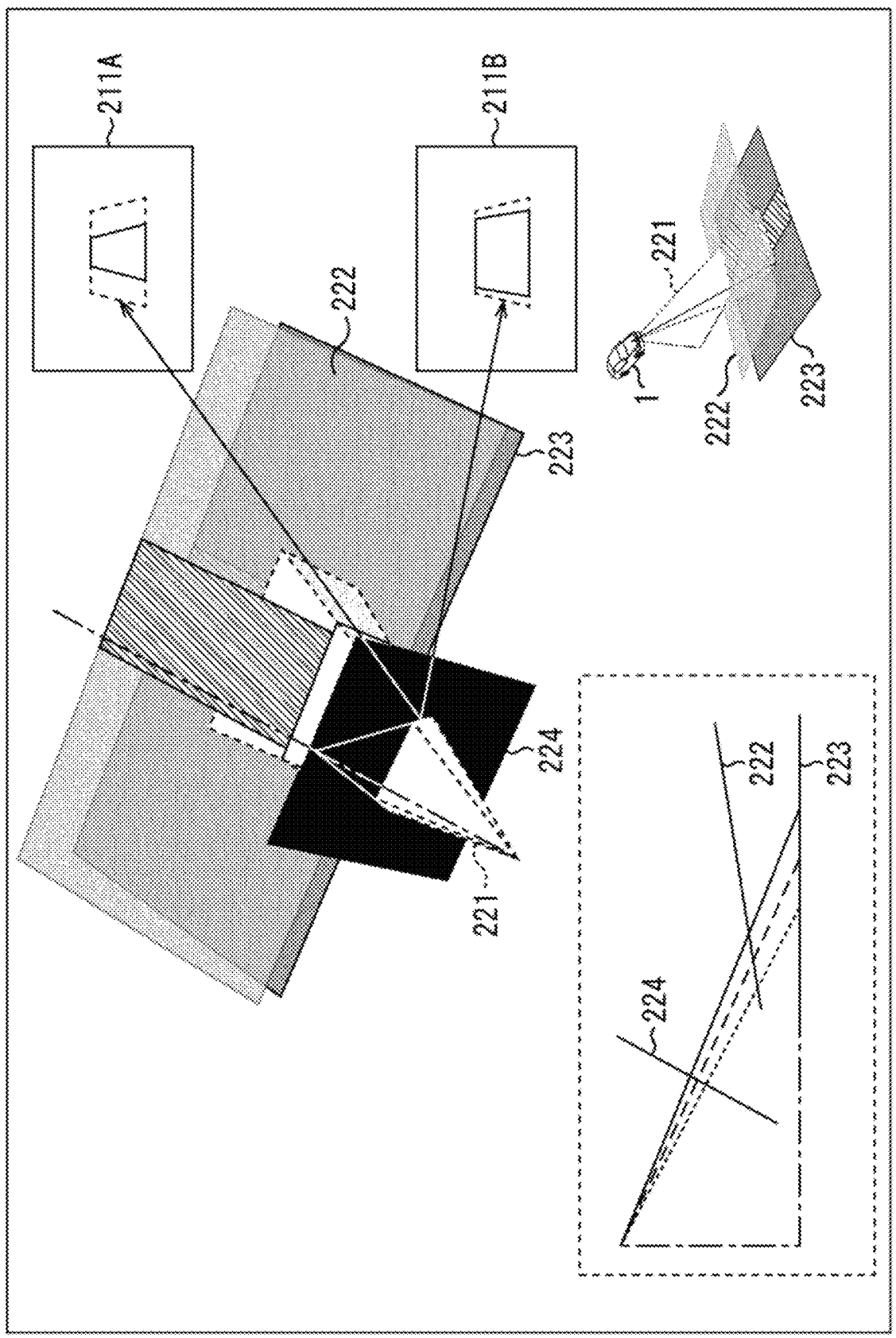
FIG. 16 is a diagram for explaining the details of a forward tilt of the vehicle body.
Figure 17:
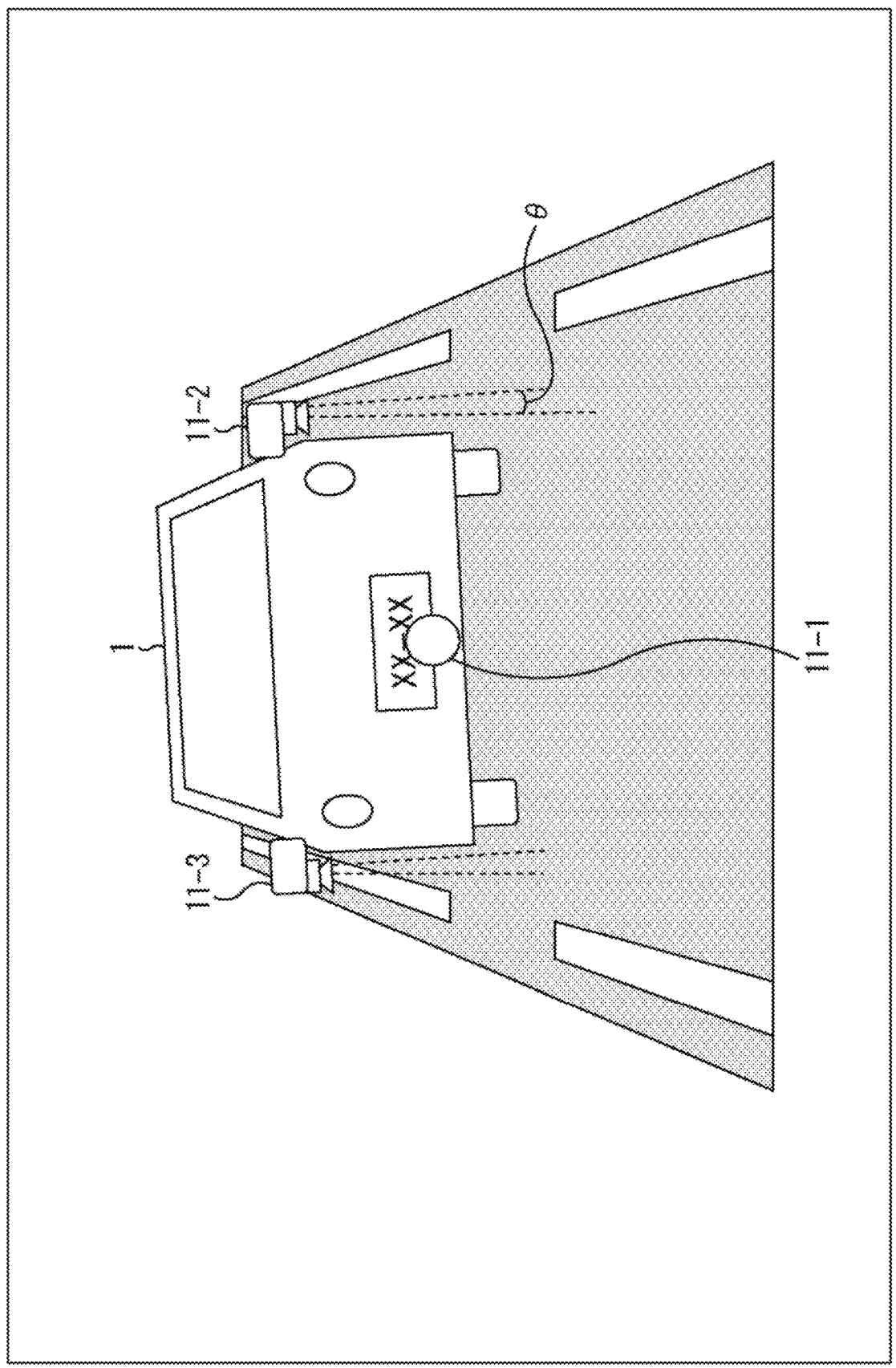
FIG. 17 is a diagram for explaining the details of a right forward tilt of the vehicle body.

Referring now to FIGS. 15 through 17, the forward tilt of the vehicle body 1 mentioned above with reference to FIG. 1 is described in detail.

The example in FIG. 15 shows an overhead image 211, a long-sided cone 221 representing the field angle of the front camera (the camera 11-1) of the vehicle body 1, an imaged road surface 222 in a forward tilting state, a road surface 223 predicted at the time of shipment from the factory, and the like. As shown in FIG. 15, the surround-view overhead image 211 is obtained by converting a view field image of a region to be a rectangular region, for example, on the road surface from the wide angle camera 11-1.

When the vehicle body 1 tilts forward due to imbalance in baggage or the like, the imaged road surface 222 of the camera 11-1 comes closer than the road surface 223 predicted at the time of shipment from the factory. Therefore, the current road surface image in the same imaging region captured by the camera 11-1 spreads outward (or appears to be enlarged) in the same field angle screen. Although the camera 11-1 has been described, the camera used here is not necessarily the front camera 11-1.

In practice, a camera for wide angle images including the infinite far point is used. However, as shown in FIG. 16, in a case where an overhead image 211A that is projected on a conventional projection plane 224 and is shown on the road surface 223 predicted at the time of shipping from the factory is a central projection image including the rectangular shape of the road surface, for example, the parallel lines on the right and left sides of the vehicle are captured as the right and left sides of a trapezoid. In a case where the infinite far point is included in the screen, the intersection point is the so-called infinite point.

If this becomes closer through parallel movement, only the enlargement factor will change. However, if the front of the vehicle body 1 sinks forward, the forward-tilting imaged road surface 222 becomes closer to the camera 11-1 than the road surface 223 predicted at the time of shipping from the factory, and the front portion comes closer. As a result, in the screen having the same field angle, the imaged road surface 222 appears to spread outside the long-sided cone 221 that determines the field angle. In other words, the overhead transformed image 221B of the camera 11-1 in a forward tilting state spreads more forward than the overhead transformed image 221A on the conventional projection plane 224.

FIG. 17 further shows a front view of the vehicle body 1 sinking on the right side. As can be seen from FIG. 17, when the vehicle body 1 sinks on the right side (as viewed from the front), the line segment detected as an image rotates counterclockwise in accordance with its rotation amount (or a roll angle θ), because the vehicle body 1 rotates clockwise.

[Example of the Calibration Process]

Figure 18:
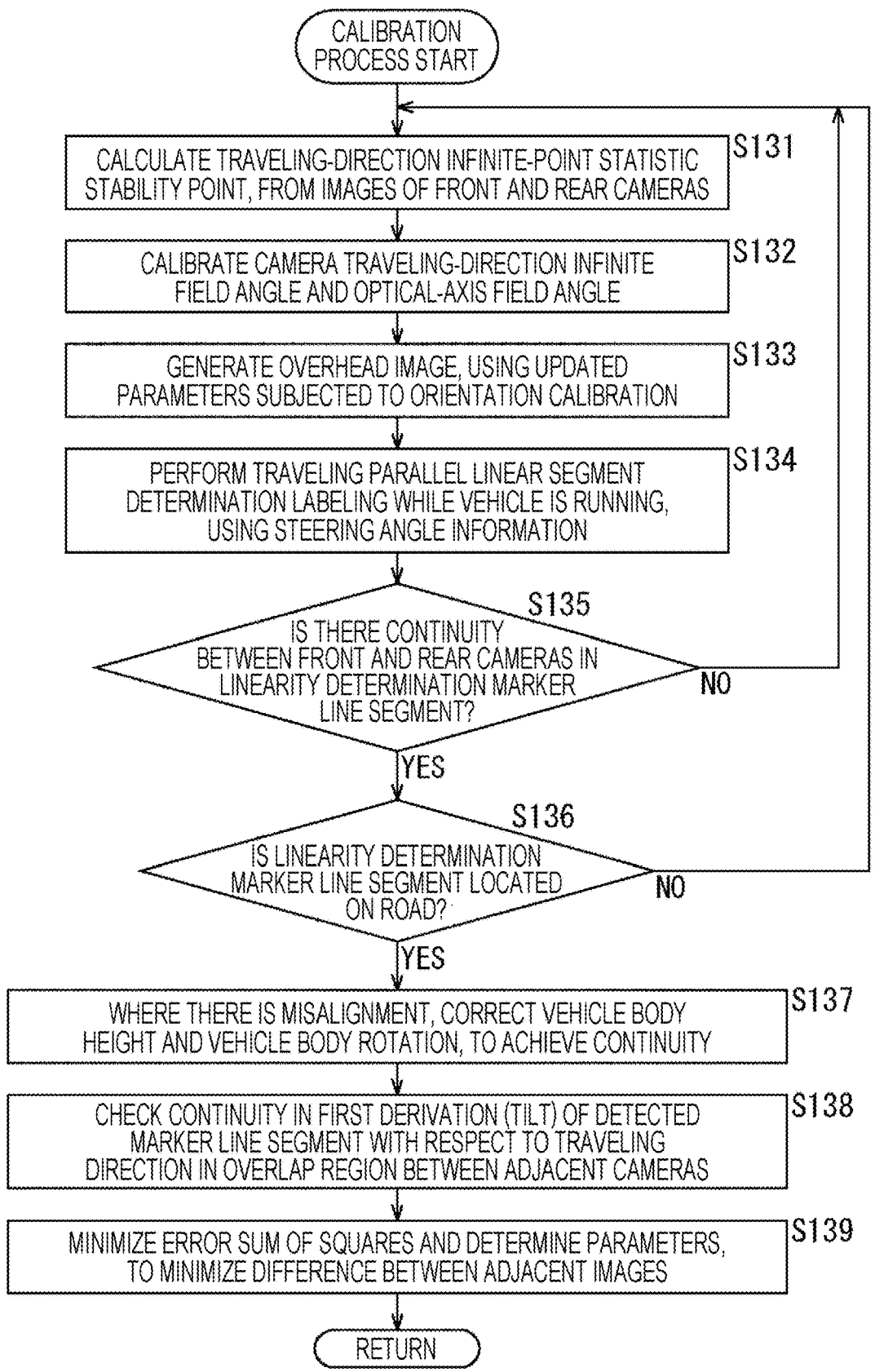
FIG. 18 is a flowchart for explaining a calibration process in step S64 in FIG. 6.

Referring now to the flowchart in FIG. 18, the calibration process in step S64 in FIG. 6 is described. It should be noted that steps S131 through S136 are a calibration process to be performed for the respective cameras 11 (particularly, the front and rear cameras), and step S137 and the steps that follow are a calibration process to be performed between adjacent cameras for the right and left cameras 11, with the use of the results from steps S131 through S136.

In step S131, the line segment detection unit 121 to the camera external parameter offset value provisional recording memory 134 calculate the statistic stability point of the running direction infinite point, from images of the previously provided cameras 11-1 through 11-4 (particularly the cameras 11 disposed at the front and the rear).

Specifically, information about infinite points obtained by various methods (information about an infinite point from the line segment curve estimation unit 122, an infinite point from the infinite point searcher 124, an infinite point from the infinite point statistic calculator 127, and an infinite point from the infinite point calculation unit 131) is input. Using these infinite points, the infinite point offset calculation unit 129 calculates infinite point offsets (updated parameters) based on a detected infinite point and the saved default parameters.

In a case where there is no difference between the calculated infinite point offsets and the parameter default values or cumulative nearest travel values, the next step S132 is skipped, and calibration of the pitch and the yaw angle of the cameras mounted at the front and the rear of the vehicle is not changed.

In step S132, the infinite point offset calculation unit 129 calibrates the infinite field angle in the running direction and the optical axis field angle. The infinite point offset calculation unit 129 supplies the calibrated updated parameters to the overhead image transform unit 135 and the detection line segment labeling and curvature determination unit 136, and also provisionally records the calibrated updated parameters on the camera external parameter offset value provisional recording memory 134.

It should be noted that the vertical pitch shift calibrated here and the lateral yaw shift, which are the camera optical axis or the virtual optical axis and the infinite points are calibrated as information about the field angle shift conversion values or parameters that can be equivalently converted.

In step S133, the overhead image transform unit 135 transforms images subjected to rotation calibration, and generates overhead images. The overhead image transform unit 135 outputs the generated overhead image to the parameter optimization unit 114. It should be noted that the processes in step S134 and the steps that follow can be performed without overhead image transform, and therefore, generation of overhead view images may be performed after step S139.

In step S134, the line segment labeling and curvature determination unit 136 also uses steering angle (yaw angle) information in determining straight line segments and sections in the detection marker on the road, for example, and performs properness/improperness labeling as markers for calibration on the line segments, in accordance with image information obtained by the previously provided camera 11-1. The purpose of labeling here is to check sameness between a line segment determined to be a straight section by the front camera 11-1 and the line segment subjected to the labeling, or to achieve matching in detecting a shift difference from the line segment, as the line segment has been determined to be a straight line portion by the front camera 11-1 beforehand when the line segment entered the view angle of the rear camera 11-3 and follow-up detection was performed as the vehicle keeps running.

In step S135, the line segment labeling and curvature determination unit 136 determines whether the linearity determination marker line segment has continuity, by referring to the labeled line segment with the cameras disposed at the front and the rear. If it is determined in step S135 that the linearity determination marker line segment does not have continuity by the cameras disposed at the front and the rear, the process returns to step S131, and the procedures thereafter are repeated.

If it is determined in step S135 that the linearity determination marker line segment has continuity by the cameras 11 disposed at the front and the rear, the process moves on to step S136. In step S136, the on-road line segment determination unit 137 determines whether the linearity determination marker line segment is located on the road surface. It should be noted that, at this stage, height determination is also performed, and height line segments such as curbstone, for example, are excluded from process, because the projection plane at the time of overhead-view transform shifts laterally by the amount equivalent to the height of the curbstone.

If it is determined in step S136 that the linearity determination marker line segment is not located on the road surface, the process returns to step S131, and the procedures that follow are also repeated for all the other detected lines. It should be noted that since indefinite line segments such as distant line segments and roadside buildings outside the road surface are unnecessary, the relevant process may be limited to a predictable road surface range such as a finite neighbor trapezoidal range. Further, at this stage, the vehicle closest line segment includes information with the highest accuracy, and therefore, line segment reliability weighting may be performed in accordance with the distances from the vehicle body.

The parameter control unit 113 supplies the parameter optimization unit 114 with the parameters provisionally recorded in the camera external parameter offset value memory 134 and the information about the field angle shift converted by the field angle shift conversion unit 138. In step S137, if the supplied parameters show that there is a positional shift between adjacent cameras 11, the parameter optimization unit 114 corrects the vehicle body height and the vehicle body rotation to achieve continuity.

In step S138, the parameter optimization unit 114 checks the continuity of the first derivation (tilt) of the above mentioned detection marker line segment with respect to the running direction in the overlapping area (E of FIG. 1) between adjacent cameras 11.

In step S139, the parameter optimization unit 114 performs parameter calculation so that smoothly connected line segments appear between all the cameras disposed in the periphery in accordance with these restraint conditions (the reliability of line segments). However, perfect matching cannot be always achieved, and therefore, parameters are finally determined by minimizing the error sum of squares so that the difference between adjacent cameras 11 is minimized. In accordance with the determined parameters, the parameter control unit 113 updates the updated external parameter memory 133 for each camera. The updated external parameter memory 133 for each camera is then used for the next process.

However, in a case where the infinite calibration values for a specific camera greatly differ from the history information, for example, the tilt of the installation orientation or the like of the camera due to some external factor may extend beyond the conventional vehicle body posture shift. In such a case, the tilt or the like is regarded as abnormality, and processing is performed, so that parameter adjustment is performed to conduct calibration to achieve the other matching between the cameras.

As described above, in the present technology, the front and rear cameras 11-1 and 11-3 detect a tilt from the positional relationship between the infinite point (vanishing point) and the lane lines on a straight road, and a positional shift is corrected.

In the present technology, the left and right cameras 11-2 and 11-4 also correct a rotational shift by performing matching on the image portions overlapping the front and rear cameras 11-1 and 11-3 in an overhead image.

As described so far, according to the present technology, it is possible to detect a positional shift of a camera while the vehicle is running.

[Example of Effects of the Present Technology]

Figure 19:
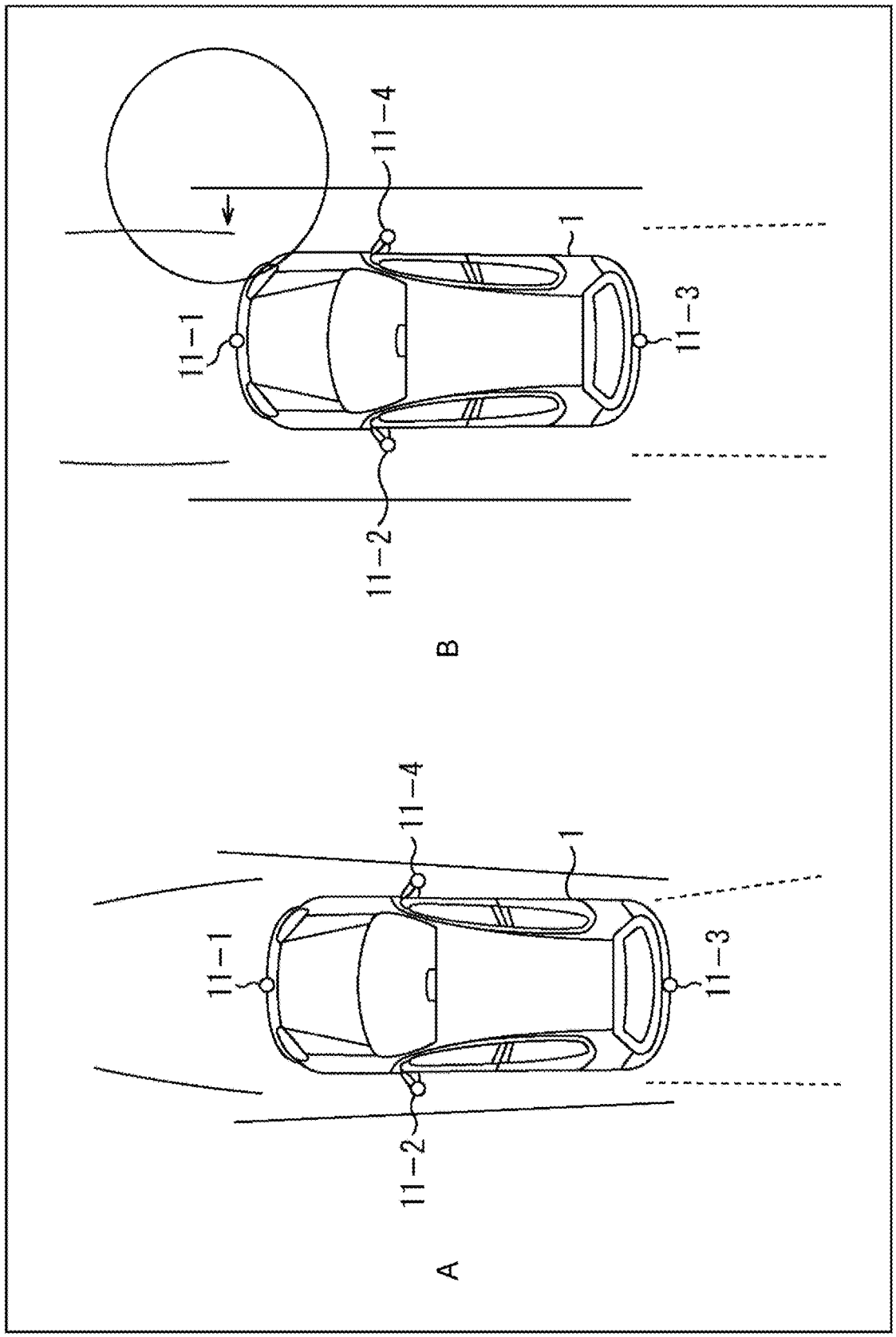
FIG. 19 is a diagram for explaining an example of effects of the present technology.

An example shown in A of FIG. 19 schematically shows an image that is a combined image of the four cameras 11-1 through 11-4 in a case where there is a shift in calibration of each camera 11.

An example shown in B of FIG. 19 shows an image in a case where parallel calibration is performed on the cameras 11-2 and 11-4 disposed on the right and left sides of the vehicle after the extending direction of the line segments captured by the cameras 11-1 and 11-3 disposed at the front and the rear of the vehicle is adjusted to the running direction, according to the present technology.

In this example, matching is performed at the four corners (E in FIG. 1) in the procedures for achieving coordinate matching and continuity of first differential values in the running direction, or the parameters are determined by minimizing errors by the least squares method so that all the images of the surroundings of the vehicle are smoothly combined. Further, as for matching point detection in this example, matching points are detected through feature detection such as proximity texture matching or Harris corner detection. Accurate image boundary combining may be performed in this manner.

It should be noted that, as shown in A of FIG. 19, an overhead-view transformed image is narrowed in the front in a case where the front is farther from the ground. On the other hand, an overhead-view transformed image becomes wider in a case where the camera is lowered without any change in the direction. An overhead-view transformed image becomes wider only on the side of the running direction in a case where the forward side rotates and becomes lower while the distance before the view angle is kept constant.

3. Third Embodiment (Example Applications)

The technology according to the present disclosure can be applied to various products. For example, the technology according to the present disclosure may be embodied as an apparatus mounted on any type of vehicle, such as an automobile, an electrical vehicle, a hybrid electrical vehicle, or a motorcycle.

[Example Configuration of a Vehicle Control System]

Figure 20:
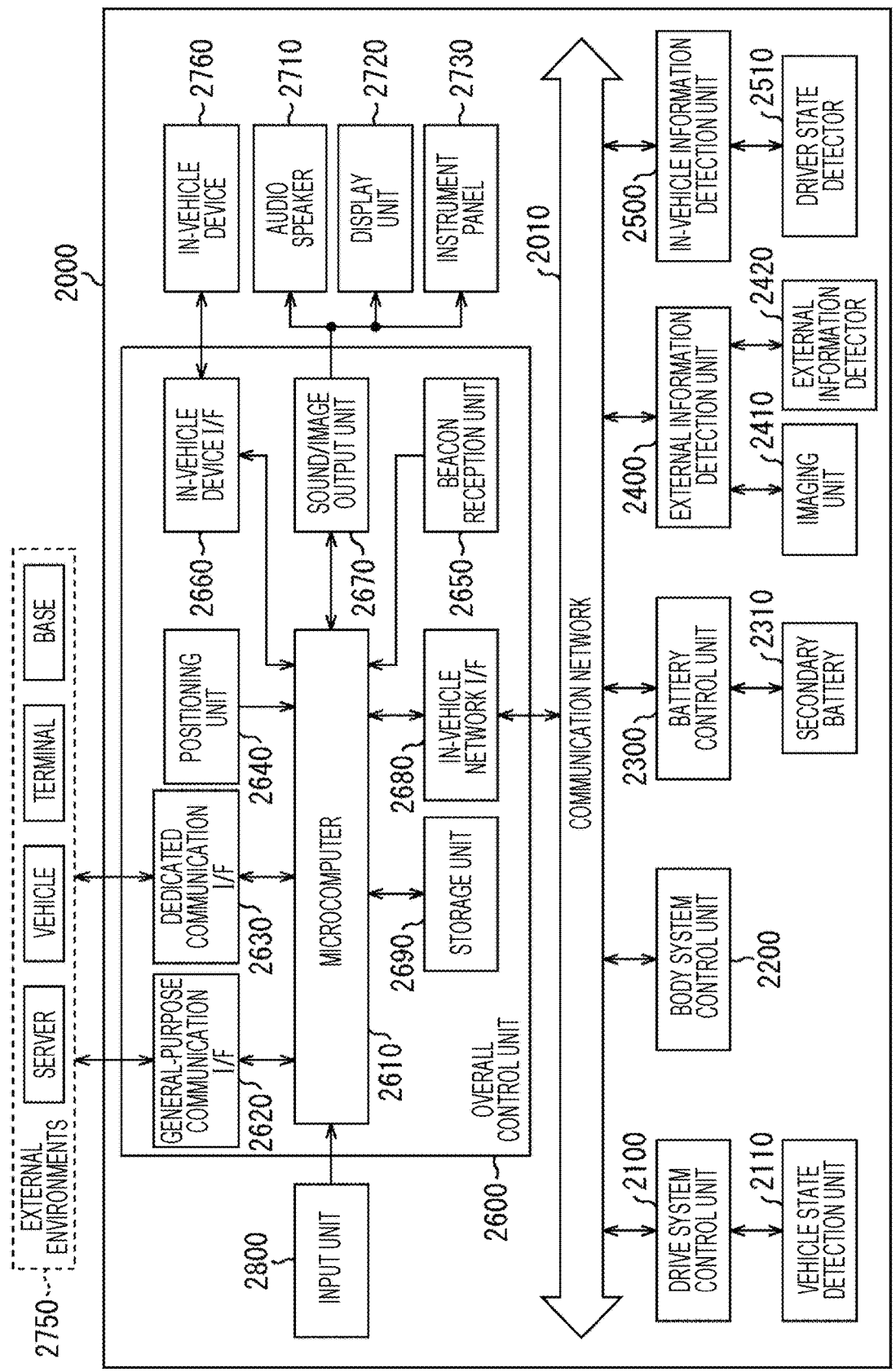
FIG. 20 is a block diagram schematically showing an example configuration of a vehicle control system.

FIG. 20 is a block diagram schematically showing an example configuration of a vehicle control system 2000 to which the technology according to the present disclosure may be applied. The vehicle control system 2000 includes a plurality of electronic control units connected via a communication network 2010. In the example shown in FIG. 20, the vehicle control system 2000 includes a drive system control unit 2100, a body system control unit 2200, a battery control unit 2300, an external information detection device 2400, an in-vehicle information detection device 2500, and an overall control unit 2600. The communication network 2010 connecting the plurality of control units may be an in-vehicle communication network compliant with an appropriate standard, such as a controller area network (CAN), a local interconnect network (LIN), a local area network (LAN), or FlexRay (registered trademark), for example.

Each of the control units includes: a microcomputer that performs arithmetic processing according to various programs; a storage unit that stores the programs to be executed by the microcomputer or the parameters to be used for various calculations; and a drive circuit that drives the current device to be subjected to various kinds of control. Each of the control units includes a communication interface for performing communication through wired communication or wireless communication with an external device or a sensor or the like, as well as a network interface for communicating with another control unit via the communication network 2010. In FIG. 20, a microcomputer 2610, a general-purpose communication interface 2620, a dedicated communication interface 2630, a positioning unit 2640, a beacon reception unit 2650, an in-vehicle device interface 2660, a sound/image output unit 2670, an in-vehicle network interface 2680, and a storage unit 2690 are shown as the functional components of the overall control unit 2600. Likewise, the other control units each include a microcomputer, a communication interface, a storage unit, and the like.

The drive system control unit 2100 controls operations of the devices related to the drive system of the vehicle according to various programs. For example, the drive system control unit 2100 functions as control devices such as a driving force generation device for generating a driving force of the vehicle such as an internal combustion engine or a driving motor, a driving force transmission mechanism for transmitting the driving force to the wheels, a steering mechanism for adjusting the steering angle of the vehicle, and a braking device for generating a braking force of the vehicle. The drive system control unit 2100 may also have functions as a control device such as an antilock brake system (ABS) or an electronic stability controller (ESC).

A vehicle state detection unit 2110 is connected to the drive system control unit 2100. For example, the vehicle state detection unit 2110 includes at least one of the following components: a gyro sensor that detects an angular velocity of axial rotation motion of the vehicle body; an acceleration sensor that detects an acceleration of the vehicle; and a sensor for detecting an operation amount of the gas pedal, an operation amount of the brake pedal, a steering angle of the steering wheel, an engine rotation speed, a wheel rotation speed, or the like. The drive system control unit 2100 performs arithmetic processing using a signal input from the vehicle state detection unit 2110, and controls the internal combustion engine, the driving motor, the electrical power steering device, the brake device, or the like.

The body system control unit 2200 controls operations of the various devices mounted on the vehicle body according to various programs. For example, the body system control unit 2200 functions as a keyless entry system, a smart key system, a power window device, or a control device for various lamps such as a head lamp, a backup lamp, a brake lamp, a turn signal lamp, a fog lamp, or the like. In this case, the body system control unit 2200 can receive a radio waves transmitted from a portable device that substitutes for a key, or signals from various switches. The body system control unit 2200 receives inputs of these radio waves or signals, and controls the door lock device, the power window device, the lamps, and the like of the vehicle.

The battery control unit 2300 controls a secondary battery 2310 that is a power supply source for the driving motor, according to various programs. For example, the battery control unit 2300 receives information, such as a battery temperature, a battery output voltage, or a remaining capacity of the battery, from a battery device including the secondary battery 2310. The battery control unit 2300 performs arithmetic processing using these signals, to control temperature adjustment of the secondary battery 2310 or to control a cooling device or the like provided in the battery device.

The external information detection device 2400 detects information outside the vehicle equipped with the vehicle control system 2000. For example, an imaging unit 2410 and/or an external information detector 2420 is connected to the external information detection device 2400. The imaging unit 2410 includes at least one of the following cameras: a time-of-flight (ToF)) camera, a stereo camera, a monocular camera, an infrared camera, and other cameras. The external information detector 2420 includes an environment sensor for detecting the current weather or meteorological phenomenon, or an ambient information detection sensor for detecting another vehicle, an obstacle, or a pedestrian around the vehicle equipped with the vehicle control system 2000, for example.

The environment sensor may be formed with at least one of the following sensors: a raindrop sensor that detects rain, a fog sensor that detects a fog, a solar radiation sensor that detects a degree of solar radiation, and a snow sensor that detects a snowfall, for example. The ambient information detection sensor may be at least one of the following devices: an ultrasonic sensor, a radar device, a LIDAR (light detection and ranging, laser imaging detection and ranging) device. The imaging unit 2410 and the external information detector 2420 may be provided as an independent device and an independent sensor, respectively, or may be provided as a device in which a plurality of sensors or devices are integrated.

[Example of Installation Positions of Imaging Units and the External Information Detectors]

Figure 21:
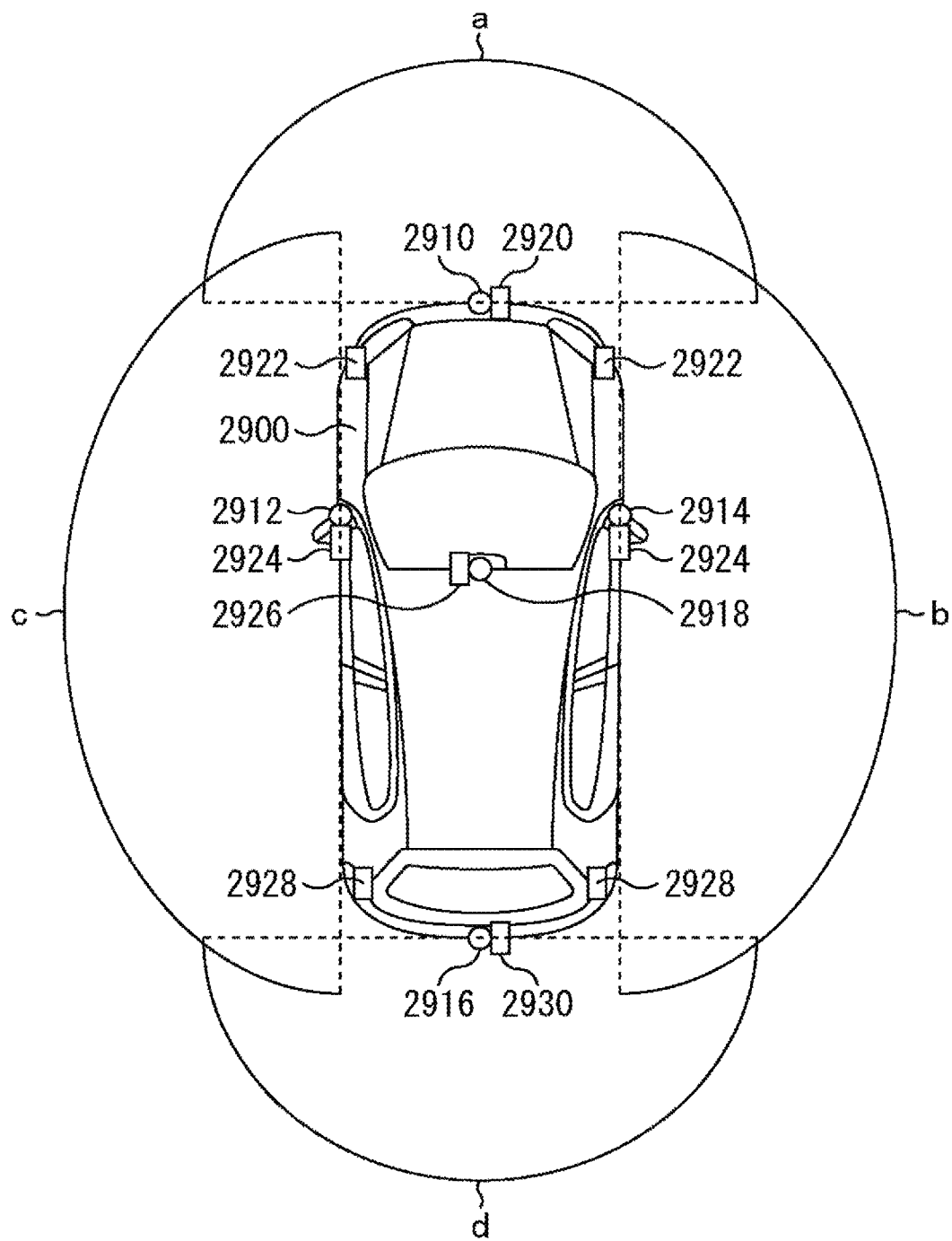
FIG. 21 is an explanatory diagram showing an example of installation positions of external information detectors and imaging units.

Here, FIG. 21 shows an example of installation positions of imaging units 2410 and external information detectors 2420. Imaging units 2910, 2912, 2914, 2916, and 2918 are provided at at least one of the following positions: the front end edge of a vehicle 2900, a side mirror, the rear bumper, a rear door, and an upper portion of the front windshield inside the vehicle, for example. The imaging unit 2910 provided on the front end edge and the imaging unit 2918 provided on the upper portion of the front windshield inside the vehicle mainly capture images ahead of the vehicle 2900. The imaging units 2912 and 2914 provided on the side mirrors mainly capture images on the sides of the vehicle 2900. The imaging unit 2916 provided on the rear bumper or a rear door mainly captures images behind the vehicle 2900. The imaging unit 2918 provided on the upper portion of the front windshield inside the vehicle is mainly used for detection of a vehicle running in front of the vehicle 2900, a pedestrian, an obstacle, a traffic signal, a traffic sign, a lane, or the like.

It should be noted that FIG. 21 shows an example of the imaging range of each of the imaging units 2910, 2912, 2914, and 2916. An imaging range a indicates the imaging range of the imaging unit 2910 provided on the front end edge, imaging ranges b and c indicate the imaging ranges of the imaging units 2912 and 2914 provided on the respective side mirrors, and an imaging range d indicates the imaging range of the imaging unit 2916 provided on the rear bumper or a rear door. For example, image data captured by the imaging units 2910, 2912, 2914, 2916 are superimposed on one another, so that an overhead image of the vehicle 2900 viewed from above is obtained.

External information detectors 2920, 2922, 2924, 2926, 2928, and 2930 provided on the front, the rear, the sides, the corners of the vehicle 2900 and an upper portion of the front windshield inside the vehicle may be ultrasonic sensors or radar devices, for example. The external information detectors 2920, 2926, and 2930 provided on the front end edge of the vehicle 2900, the rear bumper, and the rear doors, and the upper portion of the front windshield inside the vehicle may be LIDAR devices, for example. These external information detectors 2920 through 2930 are mainly used for detecting a vehicle running in front of the vehicle 2900, a pedestrian, an obstacle, or the like.

Referring back to FIG. 20, the explanation is continued. The external information detection device 2400 causes the imaging unit 2410 to capture an image of the outside of the vehicle, and receives the captured image data. The external information detection device 2400 also receives detection information from the external information detector 2420 connected thereto. In a case where the external information detector 2420 is an ultrasonic sensor, a radar device, or an LIDAR device, the external information detection device 2400 causes the external information detector 2420 to transmit ultrasonic waves, or electromagnetic waves, or the like, and receive information about received reflected waves. In accordance with the received information, the external information detection device 2400 may perform an object detection process for detecting a person, a vehicle, an obstacle, a sign, characters on the road surface, or the like, or a distance detection process. In accordance with the received information, the external information detection device 2400 may also perform an environment recognition process for recognizing a rainfall, a fog, a road surface condition, or the like. In accordance with the received information, the external information detection device 2400 may also calculate the distance to an object outside the vehicle.

Further, in accordance with the received image data, the external information detection device 2400 may perform an image recognition process for recognizing a person, a vehicle, an obstacle, a sign, characters on the road surface, or the like, or a distance detection process. The external information detection device 2400 may also perform processing such as distortion correction or positioning on the received image data, and combine the image data captured by different imaging units 2410, to generate an overhead image or a panoramic image. The external information detection device 2400 may also perform a viewpoint conversion process using image data captured by different imaging units 2410.

The in-vehicle information detection device 2500 detects information about the inside of the vehicle. For example, a driver state detector 2510 that detects the state of the driver is connected to the in-vehicle information detection device 2500. The driver state detector 2510 may include a camera that captures images of the driver, a biometric sensor that detects biological information about the driver, a microphone that collects sounds inside the vehicle, or the like. The biometric sensor is provided on the seating surface or the steering wheel or the like, for example, and detects biological information about a passenger sitting on a seat or the driver holding the steering wheel. In accordance with the detection information input from the driver state detector 2510, the in-vehicle information detection device 2500 may calculate the degree of fatigue or the degree of concentration of the driver, or determine whether the driver is dozing off. The in-vehicle information detection device 2500 may also perform a noise cancel process or the like on the collected sound signals.

The overall control unit 2600 controls the entire operation in the vehicle control system 2000 according to various programs. An input unit 2800 is connected to the overall control unit 2600. The input unit 2800 is formed with a device on which a passenger can perform an input operation, such as a touch panel, buttons, a microphone, a switch, or a lever. For example, the input unit 2800 may be a remote control device using infrared rays or some other radio waves, or an external connection device such as a portable telephone or a personal digital assistant (PDA) compatible with operations on the vehicle control system 2000. The input unit 2800 may be a camera, for example, and in that case, a passenger can input information by gesture. Further, the input unit 2800 may include an input control circuit or the like that generates an input signal in accordance with information input by a passenger or the like using the above input unit 2800, and outputs the input signal to the overall control unit 2600. By operating this input unit 2800, a passenger or the like inputs various data to the vehicle control system 2000 or issues a processing operation instruction to the vehicle control system 2000.

The storage unit 2690 may include a random access memory (RAM) that stores various programs to be executed by the microcomputer, and a read only memory (ROM) that stores various parameters, calculation results, sensor values, and the like. Also, the storage unit 2690 may be formed with a magnetic storage device such as a hard disk drive (HDD), a semiconductor storage device, an optical storage device, a magneto-optical storage device, or the like.

The general-purpose communication interface 2620 is a general communication interface that mediates communication with various devices existing in external environments 2750. The general-purpose communication interface 2620 may implement a cellular communication protocol such as GSM (registered trademark) (Global System of Mobile communications), WiMAX, LTE (Long Term Evolution), or LTE-A (LTE-Advanced), or some other wireless communication protocol such as wireless LAN (also called Wi-Fi (registered trademark)). The general-purpose communication interface 2620 may be connected to a device (an application server or a control server, for example) existing in an external network (the Internet, a cloud network, or a company-specific network, for example) via a base station or an access point. Alternatively, the general-purpose communication interface 2620 may be connected to a terminal (a terminal of a pedestrian or a shop, or a machine type communication (MTC) terminal, for example) existing in the vicinity of the vehicle, using the peer-to-peer (P2P) technology.

The dedicated communication interface 2630 is a communication interface that supports a communication protocol formulated for use in a vehicle. The dedicated communication interface 2630 may implement a standard protocol such as Wireless Access in Vehicle Environment (WAVE), which is a combination of IEEE802.11p as the lower layer and IEEE1609 as the upper layer, or Dedicated Short Range Communications (DSRC), for example. Typically, the dedicated communication interface 2630 conducts V2X (Vehicle to Vehicle) communication, which is a concept including at least one of the following kinds of communication: vehicle-to-vehicle communication, vehicle-to-infrastructure communication, and vehicle-to-pedestrian communication.

The positioning unit 2640 receives a GNSS signal (a GPS signal from a global positioning system (GPS) satellite, for example) from a global navigation satellite system (GNSS) satellite, performs positioning, and generates location information including the latitude, the longitude, and the altitude of the vehicle. It should be noted that the positioning unit 2640 may identify the current location by exchanging signals with a wireless access point, or may acquire the location information from a terminal having a positioning function, such as a portable telephone, a PHS, or a smartphone.

The beacon reception unit 2650 receives radio waves or electromagnetic waves transmitted from a radio station or the like installed on a road, for example, and acquires information about the current location, traffic congestion, closing of a road, a required time, or the like. It should be noted that the functions of the beacon reception unit 2650 may be included in the dedicated communication interface 2630 described above.

The in-vehicle device interface 2660 is a communication interface that mediates connection between the microcomputer 2610 and various devices existing in the vehicle. The in-vehicle device interface 2660 may establish a wireless connection, using a wireless communication protocol such as wireless LAN, Bluetooth (registered trademark), Near Field Communication (NFC), or wireless USB (WUSB). The in-vehicle device interface 2660 may also establish a wired connection via a connection terminal (not shown) (and a cable, if necessary). The in-vehicle device interface 2660 exchanges control signals or data signals with a mobile device or a wearable device owned by a passenger, or an information device installed in or attached to the vehicle, for example.

The in-vehicle network interface 2680 is an interface that mediates communication between the microcomputer 2610 and the communication network 2010.

The in-vehicle network interface 2680 transmits and receives signals and the like, according to a predetermined protocol supported by the communication network 2010.

The microcomputer 2610 of the overall control unit 2600 controls the vehicle control system 2000 according to various programs, following information acquired via at least one of the following components: the general-purpose communication interface 2620, the dedicated communication interface 2630, the positioning unit 2640, the beacon reception unit 2650, the in-vehicle device interface 2660, and the in-vehicle network interface 2680. For example, in accordance with acquired external and internal information, the microcomputer 2610 may calculate the control target value of the driving force generation device, the steering mechanism, or the braking device, and output a control command to the drive system control unit 2100. For example, the microcomputer 2610 may perform cooperative control for the purpose of avoiding a collision of the vehicle or alleviating impact, tracking in accordance with an inter-vehicle distance, maintaining a vehicle speed, driving automatically, or the like.

The microcomputer 2610 may create local map information including surroundings information about the current location of the vehicle, in accordance with information acquired via at least one of the following components: the general-purpose communication interface 2620, the dedicated communication interface 2630, the positioning unit 2640, the beacon reception unit 2650, the in-vehicle device interface 2660, and the in-vehicle network interface 2680. The microcomputer 2610 may also generate a warning signal by predicting danger such as a collision of the vehicle, an approach of a pedestrian or the like, or entry to a closed road, in accordance with acquired information. The warning signal may be a signal for generating an alarm sound or for turning on a warning lamp, for example.

The sound/image output unit 2670 transmits an audio output signal and/or an image output signal to an output device that is capable of visually or audibly notifying the passenger(s) of the vehicle or the outside of the vehicle of information. In the example shown in FIG. 20, an audio speaker 2710, a display unit 2720, and an instrument panel 2730 are shown as output devices. The display unit 2720 may include an on-board display and/of a head-up display, for example. The display unit 2720 may have an augmented reality (AR) display function. An output device may be some other device such as a headphone, a projector, or a lamp, other than the above devices. In a case where the output device is a display device, the display device visually displays results obtained through various processes performed by the microcomputer 2610, or information received from other control units, in various forms such as text, an image, a table, or a graph. Moreover, in a case where the output device is a sound output device, the sound output device audibly outputs an analog signal by converting reproduced sound data or an audio signal formed with acoustic data into the analog signal.

In the example shown in FIG. 20, at least two control units connected via the communication network 2010 may be integrated into one control unit. Alternatively, each control unit may be formed with a plurality of control units. Further, the vehicle control system 2000 may include another control unit that is not shown in the drawing. Also, in the above description, some or all of the functions of one of the control units may be provided by some other control unit. That is, as long as information is transmitted and received via the communication network 2010, predetermined arithmetic processing may be performed by any control unit. Likewise, a sensor or a device connected to any control unit may be connected to another control unit, and a plurality of control units may transmit and receive detection information to and from one another via the communication network 2010.

In the vehicle control system 2000 described above, the image signal processing device 31 according to this embodiment described with reference to FIG. 4 can be applied to the overall control unit 2600 of the example application shown in FIG. 20. For example, the image processing IC 62, the memory 64, and the control microcomputer 65 of the image signal processing device 31 correspond to the microcomputer 2610, the storage unit 2690, and the in-vehicle network interface 2680 of the overall control unit 2600. For example, as the overall control unit 2600 synchronizes a plurality of cameras, a positional shift can be detected. As a result, the overall control unit 2600 corrects a positional shift by detecting a tilt from the positional relationship between the infinite point (vanishing point) and the lane lines on a straight road with the front and rear cameras, and corrects a rotational shift by matching the image portions overlapping the front and rear cameras 11-1 and 11-3 in an overhead image with the left and right cameras 11-2 and 11-4. By doing so, the overall control unit 2600 can calibrate a directional shift while the vehicle is running.

Further, at least one of the components of the image signal processing device 31 described with reference to FIG. 4 may be formed in a module (an integrated circuit module formed with one die, for example) for the overall control unit 2600 shown in FIG. 11. Alternatively, the image signal processing device 31 described with reference to FIG. 4 may be formed with the plurality of control units of the vehicle control system 2000 shown in FIG. 20.

It should be noted that a computer program for achieving the respective functions of the image signal processing device 31 described with reference to FIG. 4 can be implemented in any control unit or the like. It is also possible to provide a computer readable recording medium in which such a computer program is stored. The recording medium is a magnetic disk, an optical disk, a magnetooptical disk, or a flash memory, for example. Further, the above computer program may be delivered via a network, for example, without the use of any recording medium.

4. Fourth Embodiment (Personal Computer)

The above described series of processes can be performed by hardware, or can be performed by software. In a case where the series of processes are to be performed by software, the program that forms the software is installed into a computer. Note that examples of the computer include a computer embedded in dedicated hardware and a general-purpose personal computer capable of executing various functions by installing various programs therein.

[Example Configuration of a Personal Computer]

Figure 22:
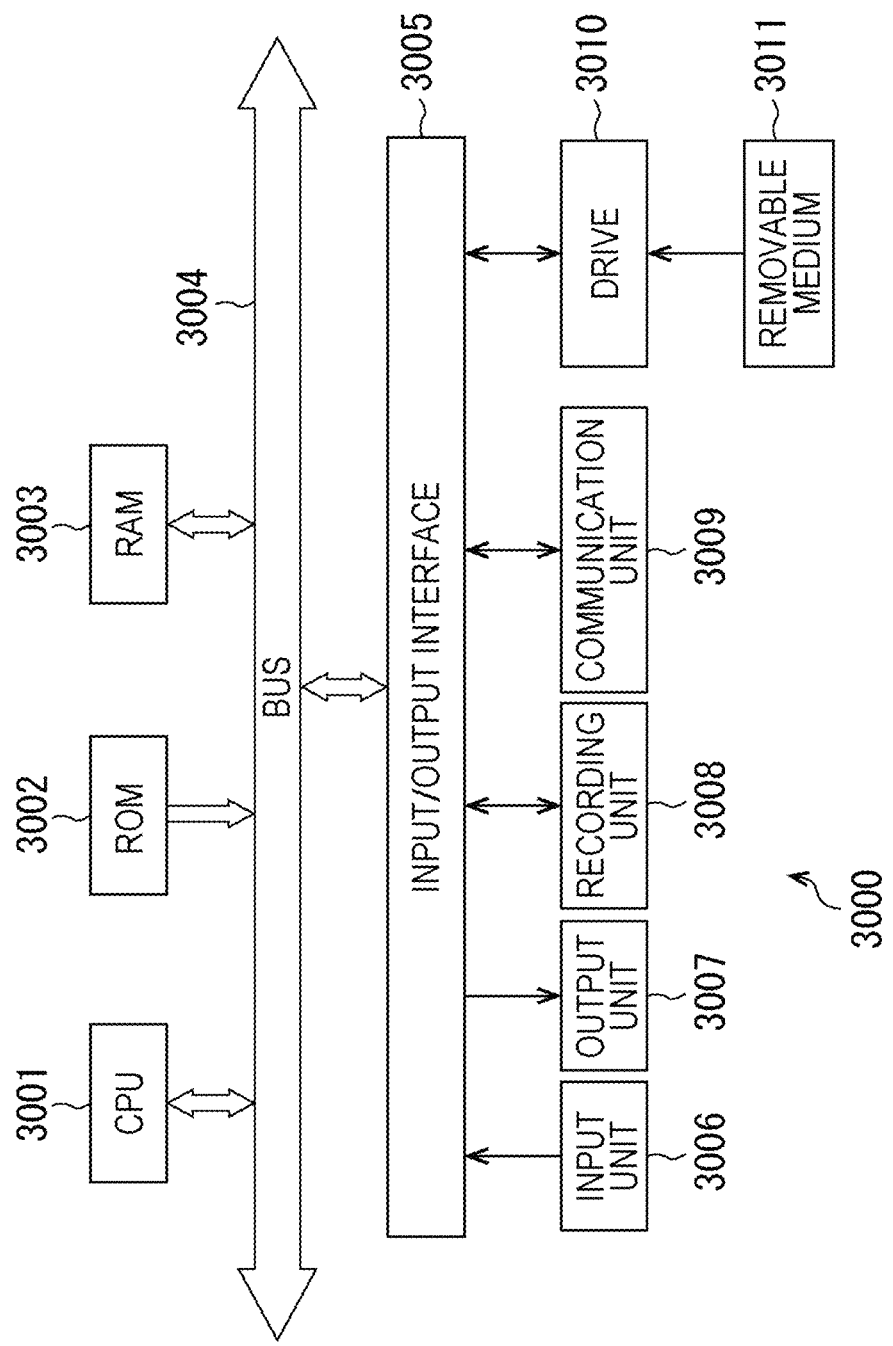
FIG. 22 is a block diagram showing an example configuration of a personal computer.

FIG. 22 is a block diagram showing an example configuration of the hardware of a personal computer that performs the above described series of processes in accordance with a program.

In the personal computer 3000, a central processing unit (CPU) 3001, a read only memory (ROM) 3002, and a random access memory (RAM) 3003 are connected to one another by a bus 3004.

An input/output interface 3005 is further connected to the bus 3004. An input unit 3006, an output unit 3007, a storage unit 3008, a communication unit 3009, and a drive 3010 are connected to the input/output interface 3005.

The input unit 3006 is formed with a keyboard, a mouse, a microphone, and the like. The output unit 3007 is formed with a display, a speaker, and the like. The storage unit 3008 is formed with a hard disk, a nonvolatile memory, or the like. The communication unit 3009 is formed with a network interface or the like. The drive 3010 drives a removable medium 3011 that is a magnetic disk, an optical disk, a magnetooptical disk, a semiconductor memory, or the like.

In the personal computer 3000 having the above described configuration, the CPU 3001 loads a program stored in the storage unit 3008 into the RAM 3003 via the input/output interface 3005 and the bus 3004, for example, and executes the program. As a result, the series of processes described above is performed.

The program to be executed by the computer (the CPU 3001) can be recorded on the removable medium 3011 and provided. The removable medium 3011 is a packaged medium or the like that is formed with a magnetic disk (including a flexible disk), an optical disk (such a Compact Disc-read only memory (CD-ROM) or a digital versatile disc (DVD)), a magnetooptical disk, a semiconductor memory, or the like. Alternatively, the program can be provided via a wired or wireless transmission medium, such as a local area network, the Internet, or digital satellite broadcasting.

In the computer, the program can be installed into the storage unit 3008 via the input/output interface 3005 when the removable medium 3011 is mounted on the drive 3010. Alternatively, the program may be received by the communication unit 3009 through a wired or wireless transmission medium, and be installed into the storage unit 3008. Other than the above, the program may be installed beforehand into the ROM 3002 or the storage unit 3008.

It should be noted that the program to be executed by the computer may be a program for performing processes in chronological order in accordance with the sequence described in the present specification, or may be a program for performing processes in parallel or performing a process in a necessary stage, such as when there is a call.

Also, in the present specification, steps describing a program recorded on a recording medium include processes to be performed in parallel or independently of one another if not necessarily in chronological order, as well as processes to be performed in chronological order in accordance with the sequence described herein.

Further, in this specification, a system refers to the entirety of equipment including more than one device.

It should be noted that embodiments of the present disclosure are not limited to the above-described embodiments, and various modifications may be made to them without departing from the scope of the present disclosure.

For example, the present disclosure can be embodied in a cloud computing configuration in which one function is shared among a plurality of devices via a network, and processing is performed by the devices cooperating with one another.

Furthermore, any configuration described above as one device (or processing unit) may be divided into two or more devices (or processing units). Conversely, any configuration described above as two or more devices (or processing units) may be combined into one device (or processing unit). Furthermore, it is of course possible to add components other than those described above to the configuration of any of the devices (or processing units). Furthermore, some components of a device (or processing unit) may be incorporated into the configuration of another device (or processing unit) as long as the configuration and the functions of the entire system remain substantially the same. That is, the present technology is not limited to the embodiments described above, but various modifications may be made to them without departing from the scope of the technology.

While preferred embodiments of the present disclosure have been described above with reference to the accompanying drawings, the present disclosure is not limited to those examples. It is apparent that those who have ordinary skills in the art can make various changes or modifications within the scope of the technical spirit claimed herein, and it should be understood that those changes or modifications are within the technical scope of the present disclosure.

It should be noted that the present technology may also be embodied in the configurations described below.

(1) An image processing apparatus including:

a vehicle state detection unit that detects a straight-running state of a vehicle;

a line segment detection unit that detects line segments from an image captured by a first camera, an image captured by a second camera disposed at a position on the opposite side of the vehicle from the first camera, and an image captured by a third camera different from both the first camera and the second camera;

an infinite point detection unit that detects an infinite point in a running background;

a first correction amount calculation unit that calculates a correction amount of the first camera, in accordance with the infinite point detected by the infinite point detection unit;

a second correction amount calculation unit that calculates a correction amount of the third camera, in accordance with the correction amount of the first camera calculated by the first correction amount calculation unit and the line segments detected by the line segment detection unit; and a correction processing unit that performs a correction process on a field angle of the first camera, in accordance with the correction amount of the first camera.

(2) The image processing apparatus according to (1), further including:

a storage unit that stores a field angle mismatch amount that is the correction amount of the first camera as a shift angle between a camera optical axis and a vehicle running direction, when the infinite point detected by the infinite point detection unit does not match a convergence point of the line segments detected by the line segment detection unit.

(3) The image processing apparatus according to (1) or (2), in which, in accordance with a time series change caused by running of the vehicle in the line segments detected by the line segment detection unit, the first correction amount calculation unit calculates the correction amount of the first camera by using a line segment in which a shift having a normal-direction component does not occur among the line segments detected by the line segment detection unit, and prohibits a process of calculating the correction amount of the first camera by using a line segment in which a shift having the normal-direction component occurs.

(4) The image processing apparatus according to (1) or (2), further including a running direction detection unit that detects a running direction of the vehicle, in which, when there is no change in the running direction detected by the running direction detection, in accordance with a time series change caused by running of the vehicle in the line segments detected by the line segment detection unit, the first correction amount calculation unit calculates the correction amount of the first camera by using a line segment in which a shift having a normal-direction component does not occur among the line segments detected by the line segment detection unit, and prohibits a process of calculating the correction amount of the first camera by using a line segment in which a shift having the normal-direction component occurs.

(5) The image processing apparatus according to any of (1) to (3), further including a running direction detecting unit that detects a running direction of the vehicle, in which, when there is no change in the running direction detected by the running direction detection, in accordance with a time series change caused by running of the vehicle in the line segments detected by the line segment detection unit, the first correction amount calculation unit excludes a plurality of line segments from a correction process when there is a time series change in a line segment intersection point of the plurality of line segments detected by the line segment detection unit.

(6) The image processing apparatus according to (4) or (5), in which the running direction detection unit detects the running direction of the vehicle by detecting a yaw angle of the vehicle.

(7) The image processing apparatus according to any of (1) to (6), in which the second correction amount calculation unit calculates a correction amount of the second camera so that first derivation of a line segment in an overhead-view transformed image of the line segment detected while the vehicle is running becomes the same between different camera images, an axis being a running direction of the line segments detected by the line segment detection unit.

(8) The image processing apparatus according to any of (1) to (7), in which the second correction amount calculation unit calculates a correction amount of the second camera so that first derivation of the line segments detected by the line segment detection unit becomes the same in an overhead image or an undistorted image projected through fisheye projection, an axis being a running direction of the line segments detected by the line segment detection unit.

(9) The image processing apparatus according to any of (1) to (8), in which, in accordance with a recognition pattern on an imaged road surface, the second correction amount calculation unit calculates position correction of the third camera so that a position in a vehicle running direction identified by each camera is the same between the image captured by the first camera and the image captured by the third camera.

(10) The image processing apparatus according to any one of (1) to (9), in which the first correction amount calculation unit calculates the correction amount of the first camera and a correction amount of the second camera, in accordance with the infinite point detected by the infinite point detection unit and a tilt of the line segments detected by the line segment detection unit, and the second correction amount calculation unit calculates the correction amount of the third camera and a correction amount of a fourth camera disposed at a position on the opposite side from the third camera, in accordance with the correction amount of the first camera and the correction amount of the second camera, and the line segments detected by the line segment detection unit.

(11) The image processing apparatus according to (10), in which, when lane widths are detected by the first and second cameras, the first correction processing unit performs correction for matching the lane widths.

(12) The image processing apparatus according to (10), in which, when lane widths are not detected by the first and second cameras at the same time, the first correction processing unit performs correction for matching the lane width detected by the first camera to a vehicle width detected at a predicted passage time after a camera field of the second camera passed through.

(13) The image processing apparatus according to any of (1) to (12), further including:

a difference detection unit that detects a difference in timing among the first, second, and third cameras, and a command transmission unit that transmits a synchronization command to each camera via a signal line, in accordance with the difference detected by the difference detection unit.

(14) The image processing apparatus according to (13), in which the synchronization command includes time information proportional to a delay amount calculated with reference to synchronization timing of a reference camera, and the command transmission unit transmits the synchronization command.

(15) The image processing apparatus according to any of (1) to (14), in which the first, second, and third cameras have a view angle of at least 150°, and has a rear axis of a symmetrical optical system in a downward direction at least 30° with respect to a horizontal direction, a straight running direction of the vehicle being located at an image height of at least 30° around an optical axis of each camera.

(16) The image processing apparatus according to any of (1) to (15), in which the vehicle state detection unit determines a straight-running state of the vehicle, in accordance with data information about one or a combination of a global navigation satellite system (GNSS), global positioning system (GPS) data, a yaw rate sensor, a steering angle, and a change in an intersection point of detection line segments.

(17) An image processing method implemented by an image processing apparatus, the image processing method including:

detecting a straight-running state of a vehicle;

detecting line segments from an image captured by a first camera, an image captured by a second camera disposed at a position on the opposite side of the vehicle from the first camera, and an image captured by a third camera different from both the first camera and the second camera;

detecting an infinite point in a running background;

calculating a correction amount of the first camera, in accordance with the detected infinite point;

calculating a correction amount of the third camera, in accordance with the calculated correction amount of the first camera and the line segments detected by the line segment detection unit; and performing a correction process on a field angle of the first camera, in accordance with the correction amount of the first camera.

(18) A program for causing a computer to function as:

a vehicle state detection unit that detects a straight-running state of a vehicle;

a line segment detection unit that detects line segments from an image captured by a first camera, an image captured by a second camera disposed at a position on the opposite side of the vehicle from the first camera, and an image captured by a third camera different from both the first camera and the second camera;

an infinite point detection unit that detects an infinite point in a running background;

a first correction amount calculation unit that calculates a correction amount of the first camera, in accordance with the infinite point detected by the infinite point detection unit;

a second correction amount calculation unit that calculates a correction amount of the third camera, in accordance with the correction amount of the first camera calculated by the first correction amount calculation unit and the line segments detected by the line segment detection unit; and a correction processing unit that performs a correction process on a field angle of the first camera, in accordance with the correction amount of the first camera.

(19) An image processing system including:

a first camera, a second camera, and a third camera each including:

an imaging unit that captures an image; and a transmission unit that transmits the image captured by the imaging unit, the first camera, the second camera, and the third camera being disposed on a body of a vehicle, the second camera being disposed at a position on the opposite side of the vehicle from the first camera, the third camera being different from both the first camera and the second camera;

a vehicle state detection unit that detects a straight-running state of a vehicle; and an image processing apparatus including:

a line segment detection unit that detects line segments from respective images captured by the first camera, the second camera, and the third camera;

an infinite point detection unit that detects an infinite point in a running background;

a first correction amount calculation unit that calculates a correction amount of the first camera, in accordance with the infinite point detected by the infinite point detection unit;

a second correction amount calculation unit that calculates a correction amount of the third camera, in accordance with the correction amount of the first camera calculated by the first correction amount calculation unit and the line segments detected by the line segment detection unit; and a correction processing unit that performs a correction process on a field angle of the first camera, in accordance with the correction amount of the first camera.

REFERENCE SIGNS LIST

1 Vehicle body
11, 11-1 through 11-4 Camera
21 Camera calibration system
31 Image signal processing device
41 Display unit
42 Communication network
43 Drive system control unit
44 External information detection unit
45 Environment sensor
51-1 through 51-4 Image sensor
52-1 through 52-4 Communication unit
61-1 through 61-4 Communication unit
62 Image Processing IC
63 Display control unit
64 Memory
65 Control microcomputer
66 Memory
67 Sensing chip
81 Image processing unit
82 Command reception unit
83 Control unit
91 Command transmission unit
92 Camera synchronization master signal management unit
93 Difference management unit
94 Camera control unit
95 Calibration-value-based distortion correction processing unit
96 Image combining unit
111 Yaw angle linearity determination unit
112 Parameter calculation unit
113 Parameter control unit
114 Parameter optimization unit
121 Line segment detection unit
122 Line segment curve estimation unit
123 Hough filter
124 Infinite point searcher
125 Parallel line segment determination unit
126 Optical flow filter
127 Infinite point statistical calculator
128 Yaw angle estimation unit
129 infinite point offset calculation unit
130 Internal parameter memory for each camera
131 Infinite point calculation unit
132 External parameter memory for each camera
133 Updated external parameter memory for each camera
134 Camera external parameter offset value provisional recording memory
135 Overhead image transform unit
136 Detection line segment labeling and curvature determination unit
137 On-road line segment determination unit
138 Field angle shift conversion unit
2000 Vehicle control system
3000 Personal computer

The invention claimed is:

1. An image processing apparatus comprising:

a vehicle state detection unit that detects a straight-running state of a vehicle;

a line segment detection unit that detects line segments from an image captured by a first camera, an image captured by a second camera disposed at a position on the opposite side of the vehicle from the first camera, and an image captured by a third camera different from both the first camera and the second camera;

an infinite point detection unit that detects an infinite point in a running background;

a first correction amount calculation unit that calculates a correction amount of the first camera, in accordance with the infinite point detected by the infinite point detection unit;

a second correction amount calculation unit that calculates a correction amount of the third camera, in accordance with the correction amount of the first camera calculated by the first correction amount calculation unit and the line segments detected by the line segment detection unit; and a correction processing unit that performs a correction process on a field angle of the first camera, in accordance with the correction amount of the first camera.

2. The image processing apparatus according to claim 1, further comprising:

a storage unit that stores a field angle mismatch amount that is the correction amount of the first camera as a shift angle between a camera optical axis and a vehicle running direction, when the infinite point detected by the infinite point detection unit does not match a convergence point of the line segments detected by the line segment detection unit.

3. The image processing apparatus according to claim 1, wherein, in accordance with a time series change caused by running of the vehicle in the line segments detected by the line segment detection unit, the first correction amount calculation unit calculates the correction amount of the first camera by using a line segment in which a shift having a normal-direction component does not occur among the line segments detected by the line segment detection unit, and prohibits a process of calculating the correction amount of the first camera by using a line segment in which a shift having the normal-direction component occurs.

4. The image processing apparatus according to claim 1, further comprising
a running direction detection unit that detects a running direction of the vehicle,
wherein, when there is no change in the running direction detected by the running direction detection, in accordance with a time series change caused by running of the vehicle in the line segments detected by the line segment detection unit, the first correction amount calculation unit calculates the correction amount of the first camera by using a line segment in which a shift having a normal-direction component does not occur among the line segments detected by the line segment detection unit, and prohibits a process of calculating the correction amount of the first camera by using a line segment in which a shift having the normal-direction component occurs.

5. The image processing apparatus according to claim 1, further comprising
a running direction detecting unit that detects a running direction of the vehicle,
wherein, when there is no change in the running direction detected by the running direction detection, in accordance with a time series change caused by running of the vehicle in the line segments detected by the line segment detection unit, the first correction amount calculation unit prohibits a process of calculating the correction amount of the first camera by using a plurality of line segments when there is a time series change in a line segment intersection point of the plurality of line segments detected by the line segment detection unit.

6. The image processing apparatus according to claim 4, wherein the running direction detection unit detects the running direction of the vehicle by detecting a yaw angle of the vehicle.

7. The image processing apparatus according to claim 1, wherein the second correction amount calculation unit calculates a correction amount of the second camera so that first derivation of a line segment in an overhead-view transformed image of the line segment detected while the vehicle is running becomes the same between different camera images, an axis being a running direction of the line segments detected by the line segment detection unit.

8. The image processing apparatus according to claim 1, wherein the second correction amount calculation unit calculates a correction amount of the second camera so that first derivation of the line segments detected by the line segment detection unit becomes the same in an overhead image or an undistorted image projected through fisheye projection, an axis being a running direction of the line segments detected by the line segment detection unit.

9. The image processing apparatus according to claim 1, wherein, in accordance with a recognition pattern on an imaged road surface, the second correction amount calculation unit calculates position correction of the third camera so that a position in a vehicle running direction identified by each camera is the same between the image captured by the first camera and the image captured by the third camera.

10. The image processing apparatus according to claim 1, wherein
the first correction amount calculation unit calculates the correction amount of the first camera and a correction amount of the second camera, in accordance with the infinite point detected by the infinite point detection unit and a tilt of the line segments detected by the line segment detection unit, and
the second correction amount calculation unit calculates the correction amount of the third camera and a correction amount of a fourth camera disposed at a position on the opposite side from the third camera, in accordance with the correction amount of the first camera and the correction amount of the second camera, and the line segments detected by the line segment detection unit.

11. The image processing apparatus according to claim 10, wherein, when lane widths are detected by the first and second cameras, the first correction processing unit performs correction for matching the lane widths.

12. The image processing apparatus according to claim 10, wherein, when lane widths are not detected by the first and second cameras at the same time, the first correction processing unit performs correction for matching the lane width detected by the first camera to a vehicle width detected at a predicted passage time after a camera field of the second camera passed through.

13. The image processing apparatus according to claim 1, further comprising:
a difference detection unit that detects a difference in timing among the first, second, and third cameras; and
a command transmission unit that transmits a synchronization command to each camera via a signal line, in accordance with the difference detected by the difference detection unit.

14. The image processing apparatus according to claim 13, wherein
the synchronization command includes time information proportional to a delay amount calculated with reference to synchronization timing of a reference camera, and
the command transmission unit transmits the synchronization command.

15. The image processing apparatus according to claim 1, wherein the first, second, and third cameras have a view angle of at least 150°, and has a rear axis of a symmetrical optical system in a downward direction at least 30° with respect to a horizontal direction, a straight running direction of the vehicle being located at an image height of at least 30° around an optical axis of each camera.

16. The image processing apparatus according to claim 1, wherein the vehicle state detection unit determines a straight-running state of the vehicle, in accordance with data information about one or a combination of a global navigation satellite system (GNSS), global positioning system (GPS) data, a yaw rate sensor, a steering angle, and a change in an intersection point of detection line segments.

17. An image processing method implemented by an image processing apparatus,
the image processing method comprising:
detecting a straight-running state of a vehicle;
detecting line segments from an image captured by a first camera, an image captured by a second camera disposed at a position on the opposite side of the vehicle from the first camera, and an image captured by a third camera different from both the first camera and the second camera;
detecting an infinite point in a running background;
calculating a correction amount of the first camera, in accordance with the detected infinite point;
calculating a correction amount of the third camera, in accordance with the calculated correction amount of the first camera and the line segments detected by the line segment detection unit; and
performing a correction process on a field angle of the first camera, in accordance with the correction amount of the first camera.

18. A program for causing a computer to function as:
a vehicle state detection unit that detects a straight-running state of a vehicle;
a line segment detection unit that detects line segments from an image captured by a first camera, an image captured by a second camera disposed at a position on the opposite side of the vehicle from the first camera, and an image captured by a third camera different from both the first camera and the second camera;
an infinite point detection unit that detects an infinite point in a running background;
a first correction amount calculation unit that calculates a correction amount of the first camera, in accordance with the infinite point detected by the infinite point detection unit;
a second correction amount calculation unit that calculates a correction amount of the third camera, in accordance with the correction amount of the first camera calculated by the first correction amount calculation unit and the line segments detected by the line segment detection unit; and
a correction processing unit that performs a correction process on a field angle of the first camera, in accordance with the correction amount of the first camera.

19. An image processing system comprising:
a first camera, a second camera, and a third camera each including:
an imaging unit that captures an image; and
a transmission unit that transmits the image captured by the imaging unit,
the first camera, the second camera, and the third camera being disposed on a body of a vehicle, the second camera being disposed at a position on the opposite side of the vehicle from the first camera, the third camera being different from both the first camera and the second camera; and
an image processing apparatus including:
a vehicle state detection unit that detects a straight-running state of a vehicle;
a line segment detection unit that detects line segments from respective images captured by the first camera, the second camera, and the third camera;
an infinite point detection unit that detects an infinite point in a running background;
a first correction amount calculation unit that calculates a correction amount of the first camera, in accordance with the infinite point detected by the infinite point detection unit;
a second correction amount calculation unit that calculates a correction amount of the third camera, in accordance with the correction amount of the first camera calculated by the first correction amount calculation unit and the line segments detected by the line segment detection unit; and
a correction processing unit that performs a correction process on a field angle of the first camera, in accordance with the correction amount of the first camera.

* * * * *